(12) United States Patent
Wang et al.

(10) Patent No.: US 9,323,969 B2
(45) Date of Patent: Apr. 26, 2016

(54) INDICIA READING TERMINAL INCLUDING FRAME QUALITY EVALUATION PROCESSING

(71) Applicant: Hand Held Products, Inc., Fort Mill, SC (US)

(72) Inventors: Ynjiun P. Wang, Cupertino, CA (US); Shulan Deng, San Jose, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 165 days.

(21) Appl. No.: 14/153,111

(22) Filed: Jan. 13, 2014

(65) Prior Publication Data

US 2014/0124577 A1    May 8, 2014

Related U.S. Application Data

(63) Continuation of application No. 12/263,243, filed on Oct. 31, 2008, now Pat. No. 8,628,015.

(51) Int. Cl.
*G06K 7/10* (2006.01)
*G06K 7/14* (2006.01)

(52) U.S. Cl.
CPC .......... *G06K 7/10722* (2013.01); *G06K 7/1092* (2013.01); *G06K 7/10851* (2013.01); *G06K 7/1443* (2013.01)

(58) Field of Classification Search
USPC ................ 235/462.1, 462.25, 462.45, 472.01
See application file for complete search history.

(56) References Cited

U.S. PATENT DOCUMENTS

| 3,582,884 A | 6/1971 | Shepard |
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai et al. |

(Continued)

FOREIGN PATENT DOCUMENTS

| AU | 701057 B2 | 5/1997 |
| CA | 2156153 A1 | 9/1994 |

(Continued)

OTHER PUBLICATIONS

European Patent Office, Communication pursuant to Arcticle 94(3) EPC, issued in EP2182466, dated Jan. 20, 2010 (3 pg.). Previously submitted in Parent.

(Continued)

*Primary Examiner* — Michael G Lee
*Assistant Examiner* — Tabitha Chedekel
(74) *Attorney, Agent, or Firm* — Additon, Higgins & Pendleton, P.A.

(57) ABSTRACT

There is described an indicia reading terminal that can be operative to capture a succession of frames of image data and that can be operative so that a certain frame of the succession of frames is subject to quality evaluation processing where a result of the quality evaluation processing is responsive to one or more of an incidence and sharpness of edge representations of the frame of image data.

20 Claims, 10 Drawing Sheets

(56) References Cited

U.S. PATENT DOCUMENTS

| | | | |
|---|---|---|---|
| 4,291,410 A | 9/1981 | Caples et al. | |
| 4,315,245 A | 2/1982 | Nakahara et al. | |
| 4,435,822 A | 3/1984 | Spencer et al. | |
| 4,445,118 A | 4/1984 | Taylor et al. | |
| 4,488,678 A | 12/1984 | Hara et al. | |
| 4,488,679 A | 12/1984 | Bockholt et al. | |
| 4,500,776 A | 2/1985 | Laser | |
| 4,538,060 A | 8/1985 | Sakai et al. | |
| 4,542,528 A | 9/1985 | Sanner et al. | |
| 4,561,089 A | 12/1985 | Rouse et al. | |
| 4,570,057 A | 2/1986 | Chadima, Jr. et al. | |
| 4,610,359 A | 9/1986 | Muller et al. | |
| 4,628,532 A | 12/1986 | Stone et al. | |
| 4,636,624 A | 1/1987 | Ishida et al. | |
| 4,639,932 A | 1/1987 | Schiff | |
| 4,644,523 A | 2/1987 | Horwitz | |
| 4,646,353 A | 2/1987 | Tenge et al. | |
| 4,653,076 A | 3/1987 | Jerrim et al. | |
| 4,686,363 A | 8/1987 | Schoon | |
| 4,690,530 A | 9/1987 | Fujino et al. | |
| 4,710,817 A | 12/1987 | Ando et al. | |
| 4,785,463 A | 11/1988 | Janc et al. | |
| 4,791,446 A | 12/1988 | Ishida et al. | |
| 4,794,239 A | 12/1988 | Allais | |
| 4,807,256 A | 2/1989 | Holmes et al. | |
| 4,818,856 A | 4/1989 | Matsushima et al. | |
| 4,825,058 A | 4/1989 | Poland | |
| 4,841,544 A | 6/1989 | Nuytkens | |
| 4,874,936 A | 10/1989 | Chandler et al. | |
| 4,877,949 A | 10/1989 | Danielson et al. | |
| 4,896,029 A | 1/1990 | Chandler et al. | |
| 4,901,073 A | 2/1990 | Kibrick | |
| 4,908,500 A | 3/1990 | Baumberger | |
| 4,942,474 A | 7/1990 | Akimoto et al. | |
| 4,998,010 A | 3/1991 | Chandler et al. | |
| 5,001,560 A | 3/1991 | Ericsson | |
| 5,019,699 A | 5/1991 | Koenck | |
| 5,113,445 A | 5/1992 | Wang | |
| 5,138,140 A | 8/1992 | Siemiatkowski et al. | |
| 5,153,418 A | 10/1992 | Batterman et al. | |
| 5,153,421 A | 10/1992 | Tandon et al. | |
| 5,155,343 A | 10/1992 | Chandler et al. | |
| 5,159,340 A | 10/1992 | Smith | |
| 5,189,292 A | 2/1993 | Batterman et al. | |
| 5,212,777 A | 5/1993 | Gove et al. | |
| 5,223,701 A | 6/1993 | Batterman et al. | |
| 5,227,614 A | 7/1993 | Danielson et al. | |
| 5,235,167 A | 8/1993 | Dvorkis et al. | |
| 5,237,163 A | 8/1993 | Collins et al. | |
| 5,245,695 A | 9/1993 | Basehore | |
| 5,262,871 A | 11/1993 | Wilder et al. | |
| 5,272,323 A | 12/1993 | Martino | |
| 5,278,397 A | 1/1994 | Barkan et al. | |
| 5,286,960 A | 2/1994 | Longacre, Jr. et al. | |
| 5,294,783 A | 3/1994 | Hammond, Jr. et al. | |
| 5,304,786 A | 4/1994 | Pavlidis et al. | |
| 5,304,787 A | 4/1994 | Wang | |
| 5,308,960 A * | 5/1994 | Smith | G06K 7/10851 235/454 |
| 5,311,001 A | 5/1994 | Joseph et al. | |
| 5,313,533 A | 5/1994 | Scott | |
| 5,319,185 A | 6/1994 | Obata et al. | |
| 5,327,441 A | 7/1994 | Kawazoe et al. | |
| 5,331,176 A | 7/1994 | Sant' Anselmo et al. | |
| 5,343,028 A | 8/1994 | Figarella et al. | |
| 5,345,266 A | 9/1994 | Denyer et al. | |
| 5,354,977 A | 10/1994 | Roustaei | |
| 5,378,881 A | 1/1995 | Adachi et al. | |
| 5,378,883 A | 1/1995 | Batterman et al. | |
| 5,392,447 A | 2/1995 | Schlack et al. | |
| 5,396,054 A | 3/1995 | Krichever et al. | |
| 5,399,852 A | 3/1995 | Zheng et al. | |
| 5,401,949 A | 3/1995 | Ziemacki et al. | |
| 5,412,197 A | 5/1995 | Smith | |
| 5,414,251 A | 5/1995 | Durbin | |
| 5,418,862 A | 5/1995 | Zheng et al. | |
| 5,420,409 A | 5/1995 | Longacre, Jr. et al. | |
| 5,422,470 A | 6/1995 | Kubo et al. | |
| 5,428,211 A | 6/1995 | Zheng et al. | |
| 5,430,286 A | 7/1995 | Hammond, Jr. et al. | |
| 5,430,472 A | 7/1995 | Curry | |
| 5,446,271 A | 8/1995 | Cherry et al. | |
| 5,461,425 A | 10/1995 | Fowler et al. | |
| 5,463,214 A | 10/1995 | Longacre, Jr. et al. | |
| 5,471,515 A | 11/1995 | Fossum et al. | |
| 5,471,592 A | 11/1995 | Gove et al. | |
| 5,477,042 A | 12/1995 | Wang | |
| 5,478,997 A | 12/1995 | Bridgelall et al. | |
| 5,478,999 A | 12/1995 | Figarella et al. | |
| 5,479,515 A | 12/1995 | Longacre, Jr. | |
| 5,481,098 A | 1/1996 | Davis et al. | |
| 5,487,115 A | 1/1996 | Surka | |
| 5,489,769 A | 2/1996 | Kubo et al. | |
| 5,502,297 A | 3/1996 | Sherman | |
| 5,504,524 A | 4/1996 | Lu et al. | |
| 5,512,739 A | 4/1996 | Chandler et al. | |
| 5,517,018 A | 5/1996 | Zheng et al. | |
| 5,521,366 A | 5/1996 | Wang et al. | |
| 5,524,068 A | 6/1996 | Kacandes et al. | |
| 5,537,431 A | 7/1996 | Chen et al. | |
| 5,545,886 A | 8/1996 | Metlitsky et al. | |
| 5,565,669 A | 10/1996 | Liu | |
| 5,567,934 A | 10/1996 | Zheng et al. | |
| 5,569,901 A | 10/1996 | Bridgelall et al. | |
| 5,572,006 A | 11/1996 | Wang et al. | |
| 5,585,616 A | 12/1996 | Roxby et al. | |
| 5,591,955 A | 1/1997 | Laser | |
| 5,591,956 A | 1/1997 | Longacre, Jr. et al. | |
| 5,598,007 A | 1/1997 | Bunce et al. | |
| 5,600,119 A | 2/1997 | Dvorkis et al. | |
| 5,610,387 A | 3/1997 | Bard et al. | |
| 5,612,524 A | 3/1997 | Sant' Anselmo et al. | |
| 5,621,203 A | 4/1997 | Swartz et al. | |
| 5,637,849 A | 6/1997 | Wang et al. | |
| 5,638,465 A | 6/1997 | Sano et al. | |
| 5,640,202 A | 6/1997 | Kondo et al. | |
| 5,663,549 A | 9/1997 | Katz et al. | |
| 5,665,959 A | 9/1997 | Fossum et al. | |
| 5,666,167 A | 9/1997 | Tults | |
| 5,668,803 A | 9/1997 | Tymes et al. | |
| 5,672,858 A | 9/1997 | Li et al. | |
| 5,698,833 A | 12/1997 | Skinger | |
| 5,699,447 A | 12/1997 | Alumot et al. | |
| 5,702,059 A | 12/1997 | Chu et al. | |
| 5,703,349 A | 12/1997 | Meyerson et al. | |
| 5,710,417 A | 1/1998 | Joseph et al. | |
| 5,723,823 A | 3/1998 | Bell | |
| 5,723,853 A | 3/1998 | Longacre, Jr. et al. | |
| 5,723,868 A | 3/1998 | Hammond, Jr. et al. | |
| 5,726,435 A | 3/1998 | Hara et al. | |
| 5,739,518 A | 4/1998 | Wang | |
| 5,756,981 A | 5/1998 | Roustaei et al. | |
| 5,763,864 A | 6/1998 | O'Hagan et al. | |
| 5,773,806 A | 6/1998 | Longacre, Jr. | |
| 5,773,810 A | 6/1998 | Hussey et al. | |
| 5,774,357 A | 6/1998 | Hoffberg et al. | |
| 5,780,832 A | 7/1998 | Watanabe et al. | |
| 5,780,834 A | 7/1998 | Havens et al. | |
| 5,783,811 A | 7/1998 | Feng et al. | |
| 5,784,102 A | 7/1998 | Hussey et al. | |
| 5,811,774 A | 9/1998 | Ju et al. | |
| 5,811,784 A | 9/1998 | Tausch et al. | |
| 5,814,801 A | 9/1998 | Wang et al. | |
| 5,814,803 A | 9/1998 | Olmstead et al. | |
| 5,815,200 A | 9/1998 | Ju et al. | |
| 5,818,028 A | 10/1998 | Meyerson et al. | |
| 5,818,528 A | 10/1998 | Roth et al. | |
| 5,825,006 A | 10/1998 | Longacre, Jr. et al. | |
| 5,831,254 A | 11/1998 | Karpen et al. | |
| 5,831,674 A | 11/1998 | Ju et al. | |
| 5,841,121 A | 11/1998 | Koenck | |
| 5,841,126 A | 11/1998 | Fossum et al. | |
| 5,867,594 A | 2/1999 | Cymbalski | |
| 5,867,595 A | 2/1999 | Cymbalski | |

(56) References Cited

U.S. PATENT DOCUMENTS

| | | |
|---|---|---|
| 5,875,108 A | 2/1999 | Hoffberg et al. |
| 5,877,487 A | 3/1999 | Tani et al. |
| 5,900,613 A | 5/1999 | Koziol et al. |
| 5,914,476 A | 6/1999 | Gerst, III et al. |
| 5,917,171 A | 6/1999 | Sasai et al. |
| 5,917,945 A | 6/1999 | Cymbalski |
| 5,920,477 A | 7/1999 | Hoffberg et al. |
| 5,926,214 A | 7/1999 | Denyer et al. |
| 5,929,418 A | 7/1999 | Ehrhart et al. |
| 5,932,862 A | 8/1999 | Hussey et al. |
| 5,942,741 A | 8/1999 | Longacre, Jr. et al. |
| 5,949,052 A | 9/1999 | Longacre, Jr. et al. |
| 5,949,054 A | 9/1999 | Karpen et al. |
| 5,949,056 A | 9/1999 | White |
| 5,962,838 A | 10/1999 | Tamburrini |
| 5,965,863 A | 10/1999 | Parker et al. |
| 5,979,763 A | 11/1999 | Wang et al. |
| 5,979,768 A | 11/1999 | Koenck |
| 5,984,186 A | 11/1999 | Tafoya |
| 5,986,297 A | 11/1999 | Guidash et al. |
| 6,003,008 A | 12/1999 | Postrel et al. |
| 6,012,640 A | 1/2000 | Liu |
| 6,017,496 A | 1/2000 | Nova et al. |
| 6,019,286 A | 2/2000 | Li et al. |
| 6,053,407 A | 4/2000 | Wang et al. |
| 6,064,763 A | 5/2000 | Maltsev |
| 6,070,800 A | 6/2000 | Fujita et al. |
| 6,082,619 A | 7/2000 | Ma et al. |
| 6,082,621 A | 7/2000 | Chan et al. |
| 6,094,739 A | 7/2000 | Miller et al. |
| 6,119,179 A | 9/2000 | Whitridge et al. |
| 6,123,264 A | 9/2000 | Li et al. |
| 6,129,278 A | 10/2000 | Wang et al. |
| 6,144,453 A | 11/2000 | Hallerman et al. |
| 6,152,368 A | 11/2000 | Olmstead et al. |
| 6,155,491 A | 12/2000 | Dueker et al. |
| 6,161,760 A | 12/2000 | Marrs et al. |
| 6,170,749 B1 | 1/2001 | Goren et al. |
| 6,173,894 B1 | 1/2001 | Olmstead et al. |
| 6,176,428 B1 | 1/2001 | Joseph et al. |
| 6,176,429 B1 | 1/2001 | Reddersen et al. |
| 6,179,208 B1 | 1/2001 | Feng |
| 6,186,404 B1 | 2/2001 | Ehrhart et al. |
| 6,215,992 B1 | 4/2001 | Howell et al. |
| 6,219,182 B1 | 4/2001 | McKinley |
| 6,230,975 B1 | 5/2001 | Colley et al. |
| 6,264,105 B1 | 7/2001 | Longacre, Jr. et al. |
| 6,276,605 B1 | 8/2001 | Olmstead et al. |
| 6,311,895 B1 | 11/2001 | Olmstead et al. |
| 6,315,204 B1 | 11/2001 | Knighton et al. |
| 6,329,139 B1 | 12/2001 | Nova et al. |
| 6,347,163 B2 | 2/2002 | Roustaei |
| 6,360,948 B1 | 3/2002 | Yang et al. |
| 6,371,373 B1 | 4/2002 | Ma et al. |
| 6,385,352 B1 | 5/2002 | Roustaei |
| 6,398,112 B1 | 6/2002 | Li et al. |
| 6,429,934 B1 | 8/2002 | Dunn et al. |
| 6,443,360 B1 | 9/2002 | Marchi et al. |
| 6,462,842 B1 | 10/2002 | Hamilton |
| 6,486,911 B1 | 11/2002 | Denyer et al. |
| 6,491,223 B1 | 12/2002 | Longacre, Jr. et al. |
| 6,493,029 B1 | 12/2002 | Denyer et al. |
| 6,505,778 B1 | 1/2003 | Reddersen et al. |
| 6,508,404 B2 | 1/2003 | Hecht |
| 6,512,218 B1 | 1/2003 | Canini et al. |
| 6,525,827 B2 | 2/2003 | Liu |
| 6,547,139 B1 | 4/2003 | Havens et al. |
| 6,547,142 B1 | 4/2003 | Goren et al. |
| 6,552,323 B2 | 4/2003 | Guidash et al. |
| 6,552,746 B1 | 4/2003 | Yang et al. |
| 6,565,003 B1 | 5/2003 | Ma |
| 6,575,367 B1 | 6/2003 | Longacre, Jr. |
| 6,578,766 B1 | 6/2003 | Parker et al. |
| 6,585,159 B1 | 7/2003 | Meier et al. |
| 6,598,797 B2 | 7/2003 | Lee |
| 6,606,171 B1 | 8/2003 | Renk et al. |
| 6,634,558 B1 | 10/2003 | Patel et al. |
| 6,637,658 B2 | 10/2003 | Barber et al. |
| 6,655,595 B1 | 12/2003 | Longacre, Jr. et al. |
| 6,661,521 B1 | 12/2003 | Stern |
| 6,665,012 B1 | 12/2003 | Yang et al. |
| 6,666,377 B1 | 12/2003 | Harris |
| 6,672,511 B1 | 1/2004 | Shellhammer |
| 6,678,412 B1 | 1/2004 | Shigekusa et al. |
| 6,685,095 B2 | 2/2004 | Roustaei et al. |
| 6,698,656 B2 | 3/2004 | Parker et al. |
| 6,714,239 B2 | 3/2004 | Guidash |
| 6,714,665 B1 | 3/2004 | Hanna et al. |
| 6,722,569 B2 | 4/2004 | Ehrhart et al. |
| 6,729,546 B2 | 5/2004 | Roustaei |
| 6,732,929 B2 | 5/2004 | Good et al. |
| 6,732,930 B2 | 5/2004 | Massieu et al. |
| 6,736,321 B2 | 5/2004 | Tsikos et al. |
| 6,739,511 B2 | 5/2004 | Tsikos et al. |
| 6,742,707 B1 | 6/2004 | Tsikos et al. |
| 6,814,290 B2 | 11/2004 | Longacre |
| 6,832,729 B1 | 12/2004 | Perry et al. |
| 6,834,806 B2 | 12/2004 | Benedetti |
| 6,837,432 B2 | 1/2005 | Tsikos et al. |
| 6,854,649 B2 | 2/2005 | Worner et al. |
| 6,857,570 B2 | 2/2005 | Tsikos et al. |
| 6,858,159 B2 | 2/2005 | Lyons |
| 6,860,428 B1 | 3/2005 | Dowling et al. |
| 6,863,216 B2 | 3/2005 | Tsikos et al. |
| 6,877,665 B2 | 4/2005 | Challa et al. |
| 6,982,800 B1 | 1/2006 | Cavill et al. |
| 7,055,747 B2 | 6/2006 | Havens et al. |
| 7,059,525 B2 | 6/2006 | Longacre et al. |
| 7,077,317 B2 | 7/2006 | Longacre, Jr. et al. |
| 7,077,321 B2 | 7/2006 | Longacre, Jr. et al. |
| 7,080,786 B2 | 7/2006 | Longacre, Jr. et al. |
| 7,086,596 B2 | 8/2006 | Meier et al. |
| 7,090,132 B2 | 8/2006 | Havens et al. |
| D528,146 S | 9/2006 | Fitch |
| 7,104,456 B2 | 9/2006 | Parker et al. |
| 7,261,238 B1 | 8/2007 | Carlson et al. |
| 7,270,273 B2 | 9/2007 | Barber et al. |
| 7,540,424 B2 | 6/2009 | Knowles et al. |
| 7,852,519 B2 | 12/2010 | Meier et al. |
| 8,628,015 B2 | 1/2014 | Wang et al. |
| 2001/0038037 A1 | 11/2001 | Bridgelall et al. |
| 2002/0035715 A1 | 3/2002 | Hatakeyama |
| 2002/0039099 A1 | 4/2002 | Harper |
| 2002/0039197 A1 | 4/2002 | Hikichi |
| 2002/0039457 A1 | 4/2002 | Helms et al. |
| 2002/0135683 A1 | 9/2002 | Tamama et al. |
| 2002/0145043 A1 | 10/2002 | Challa et al. |
| 2002/0158127 A1 | 10/2002 | Hori et al. |
| 2002/0170970 A1 | 11/2002 | Ehrhart |
| 2003/0042311 A1 | 3/2003 | Longacre et al. |
| 2003/0062418 A1 | 4/2003 | Barber et al. |
| 2003/0085282 A1 | 5/2003 | Parker et al. |
| 2003/0136843 A1 | 7/2003 | Ralph et al. |
| 2003/0146283 A1 | 8/2003 | Longacre et al. |
| 2003/0218067 A1 | 11/2003 | Parker et al. |
| 2004/0004128 A1 | 1/2004 | Pettinelli et al. |
| 2004/0013315 A1* | 1/2004 | Li .................... H04N 17/00 382/268 |
| 2004/0094627 A1 | 5/2004 | Parker et al. |
| 2004/0195332 A1 | 10/2004 | Barber et al. |
| 2004/0206821 A1 | 10/2004 | Longacre et al. |
| 2004/0256464 A1 | 12/2004 | Longacre et al. |
| 2004/0256465 A1 | 12/2004 | Longacre |
| 2004/0262392 A1 | 12/2004 | Longacre et al. |
| 2004/0262394 A1 | 12/2004 | Longacre et al. |
| 2004/0262395 A1 | 12/2004 | Longacre et al. |
| 2004/0262396 A1 | 12/2004 | Longacre et al. |
| 2004/0262399 A1 | 12/2004 | Longacre et al. |
| 2005/0056699 A1 | 3/2005 | Meier et al. |
| 2005/0103851 A1 | 5/2005 | Zhu et al. |
| 2005/0161511 A1 | 7/2005 | Parker et al. |
| 2006/0054704 A1 | 3/2006 | Fitch et al. |
| 2006/0091219 A1* | 5/2006 | Joseph ............ G06K 7/10544 235/462.25 |

(56) References Cited

U.S. PATENT DOCUMENTS

| | | |
|---|---|---|
| 2006/0097054 A1 | 5/2006 | Biss et al. |
| 2006/0126129 A1 | 6/2006 | Barber et al. |
| 2006/0175413 A1 | 8/2006 | Longacre et al. |
| 2006/0255150 A1 | 11/2006 | Longacre |
| 2006/0283954 A1 | 12/2006 | Ralph et al. |
| 2007/0023526 A1 | 2/2007 | Moore et al. |
| 2007/0140574 A1 | 6/2007 | Yamaguchi et al. |
| 2007/0284448 A1 | 12/2007 | Wang |
| 2009/0078773 A1 | 3/2009 | Carlson et al. |
| 2009/0108071 A1* | 4/2009 | Carlson .............. G06K 7/10811 235/462.32 |
| 2010/0078477 A1 | 4/2010 | Wang et al. |

FOREIGN PATENT DOCUMENTS

| | | |
|---|---|---|
| CA | 2190189 A1 | 9/1994 |
| CA | 2234617 A1 | 4/1997 |
| CA | 2190190 A1 | 8/1999 |
| CN | 1204411 A | 1/1999 |
| DE | 69418598 T2 | 11/1999 |
| DE | 60123088 T2 | 3/2007 |
| DK | 685092 T3 | 11/1999 |
| EP | 1058455 A1 | 12/2000 |
| EP | 1323119 A2 | 7/2003 |
| EP | 2182466 A1 | 5/2010 |
| ES | 2134933 T3 | 10/1999 |
| GB | 2308267 A | 6/1997 |
| GB | 2343079 A | 4/2000 |
| GB | 2344486 A | 6/2000 |
| JP | H08506678 A | 7/1996 |
| JP | 2001016548 A | 1/2001 |
| JP | 2004511015 A | 4/2004 |
| WO | 9304442 A1 | 3/1993 |
| WO | 9314458 A1 | 7/1993 |
| WO | 9317397 A1 | 9/1993 |
| WO | 9318478 A1 | 9/1993 |
| WO | 9419766 A2 | 9/1994 |
| WO | 9532580 A1 | 11/1995 |
| WO | 9701828 A1 | 1/1997 |
| WO | 9708647 A1 | 3/1997 |
| WO | 9715024 A1 | 4/1997 |
| WO | 0229707 A2 | 4/2002 |
| WO | 2008097521 A2 | 8/2008 |

OTHER PUBLICATIONS

European Patent Office, European Search Report in EP 2182466, mailed Jan. 8, 2010 (3 pgs.). Previously submitted in Parent.

European Patent Office, Modified Abstract in EP2182466, mailed Jan. 8, 2010 (1 pg.). Previously submitted in Parent.

JP-2895236 B2 (cited with English language translation included in corresponding application WO94/19766). Previously submitted in Parent Application. Previously submitted in Parent.

European Patent Office, Communication Pursuant to Article 94(3) EPC, issued in EP2109844, dated Jun. 28, 2011, 3 pages. Previously submitted in Parent.

International Search Report for International Patent Application No. PCT/US2008/001475, dated Jul. 29, 2008, 3 pages. Previously submitted in Parent.

Written Opinion of the International Searching Authority for International Patent Application No. PCT/US2008/001475, dated Jul. 29, 2008, 7 pages. Previously submitted in Parent.

JP-10508133 A (cited with English language translation included in corresponding application WO96/13659). Previously submitted in Parent Application. Previously submitted in Parent.

* cited by examiner

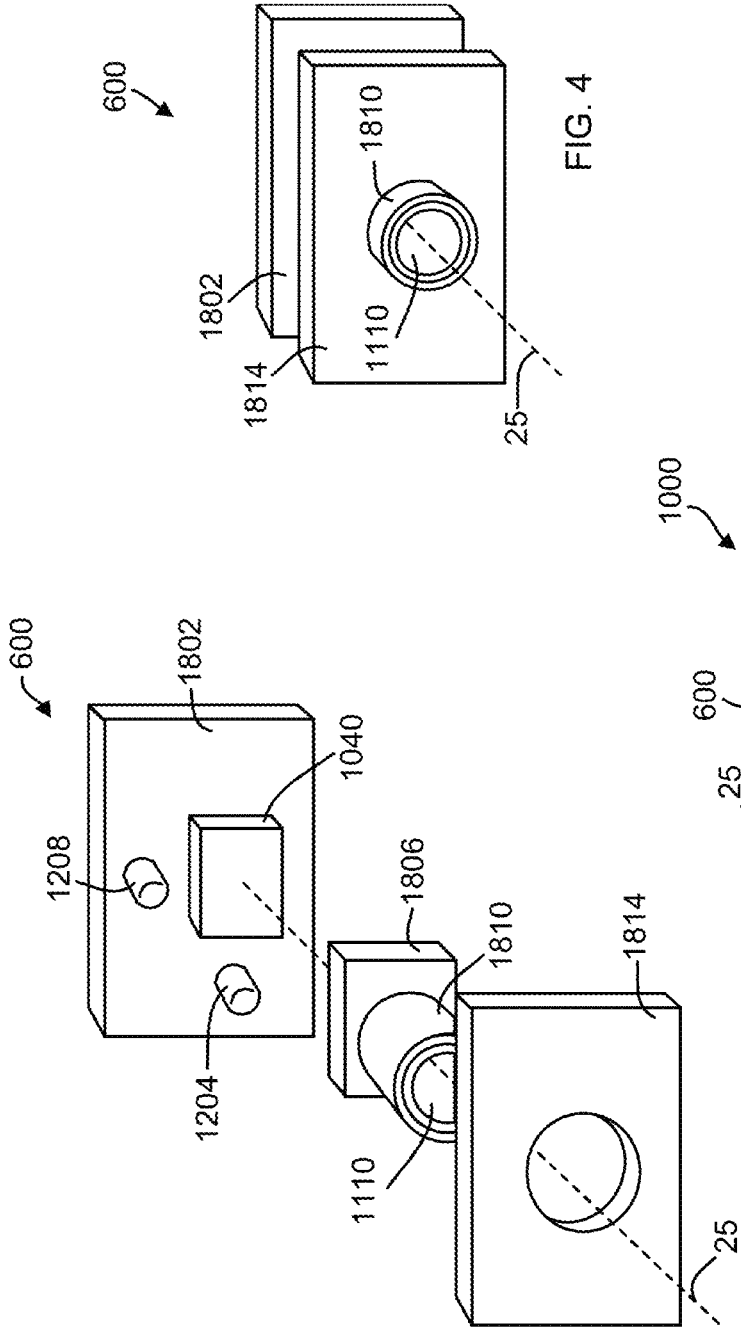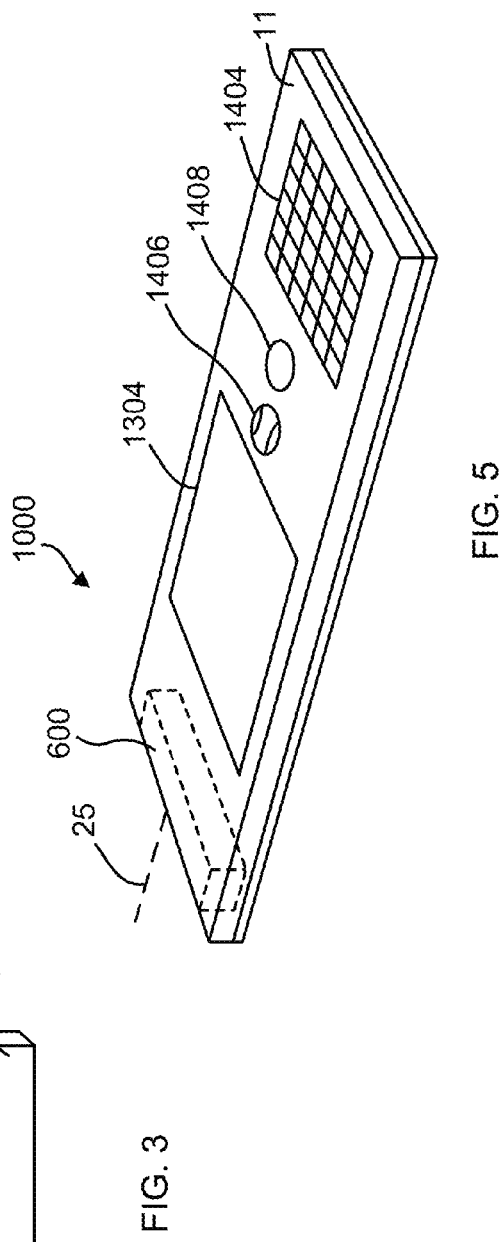

US 9,323,969 B2

INDICIA READING TERMINAL INCLUDING FRAME QUALITY EVALUATION PROCESSING

CROSS-REFERENCE TO RELATED APPLICATIONS

The present application claims the benefit of U.S. patent application Ser. No. 12/263,243 for an Indicia Reading Terminal Including Frame Quality Evaluation Processing filed Oct. 31, 2008 (and published May 6, 2010 as U.S. Patent Publication No. 2010/0108769), now U.S. Pat. No. 8,628,015. Each of the foregoing patent application, patent publication, and patent is hereby incorporated by reference in its entirety.

FIELD OF THE INVENTION

The present invention relates to registers in general and in particular to an optical based register.

BACKGROUND

Indicia reading terminals are available in multiple varieties. The well-known gun style reader as commonly seen at retail store checkout counters is typically available in a form devoid of a keyboard and display. Enhanced functioning indicia reading terminals having keyboards displays and advanced networking communication capabilities are also available. Typically, indicia reading terminals have triggers for activating decoding attempts. Whatever the variety, users of such indicia reading terminals desire snappiness of operation. A terminal's trigger to read (TTR) time is a measure of a delay between the time a trigger is actuated for initiating a decode attempt and a time a decoded message is output.

It has been observed that long trigger to read times occur when a terminal consumes time attempting to decode frames of poor quality, the poor frame quality resulting from the frame being devoid of a decodable indicia representation or is of otherwise insufficient quality due to e.g., poor illumination, poor focusing, and/or hand jitter to permit decoding. In one instance, a frame of image data devoid of a decodable indicia representation and therefore of low quality can be processed in accordance with a decoding application for a period of up to tens of frame times until a timeout period is reached without there being output a decoded message. In another instance, a frame including a decodable indicia, but of insufficient quality to allow for decoding, can be subject to processing in accordance with a decoding application for a period of up to tens of frame times until a timeout period is reached without there being output a decoded message.

There exists a need to improve TTR times for indicia reading terminals.

SUMMARY

There is described an indicia reading terminal that can be operative to capture a succession of frames of image data and that can be operative so that a certain frame of the succession of frames is subject to quality evaluation processing where a result of the quality evaluation processing is responsive to one or more of an incidence and sharpness of edge representations of the frame of image data.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is an exploded perspective view of an imaging module carrying a subset of circuits as shown in FIG. 2;

FIG. 4 is an assembled view of the imaging module of FIG. 3;

FIG. 5 is a perspective view of an indicia decoding terminal incorporating an imaging module as shown in FIGS. 3 and 4;

DETAILED DESCRIPTION

There is described an indicia reading terminal that can be operative to capture a succession of frames of image data and that can be operative so that a certain frame of the succession of frames is subject to quality evaluation processing where a result of the quality evaluation processing is responsive to one or more of an incidence and sharpness of edge representations of the frame of image data.

In one embodiment, an indicia reading terminal can be operative so that operation of the indicia reading terminal is responsive to a result of the frame quality evaluation processing. In one example, an indicia reading terminal can be operative so that an indicia reading terminal ceases attempting to decode utilizing a previous frame in response to the result of the processing. In another example, a decoding application for decoding of a frame of image data can be changed from an inactive state to an active state in response to a result of the processing. In one embodiment, frame quality evaluation processing can be carried out by a central processing unit (CPU). In one embodiment, a time period for frame quality evaluation processing by the CPU can be restricted from consuming more than a predetermined processing period. In one example, the CPU, for frame quality evaluation processing can be restricted from consuming a time period of more than a frame time, and in one particular example, the CPU, for frame quality evaluation processing can be restricted from consuming a time period of more than a predetermined fraction of a frame time.

Figure 1:
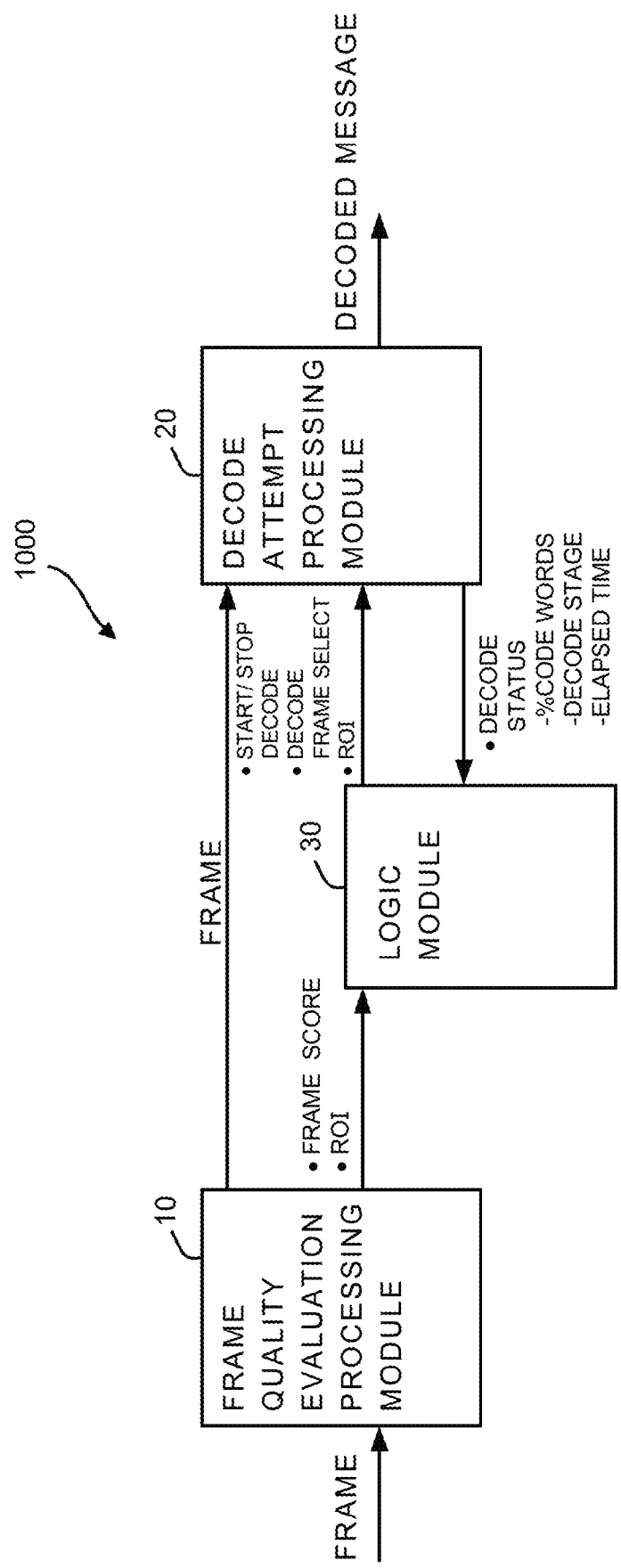
FIG. 1 is a functional block diagram illustrating an embodiment of an indicia reading terminal.

A functional block drawing illustrating an indicia reading terminal is shown in FIG. 1. Terminal 1000 can include frame quality evaluation processing module 10, decode attempt processing module 20, and logic module 30. Frame quality evaluation processing module 10 can selectively pass frames to decode attempt processing module 20 responsively to a result of processing by logic module 30. Logic module 30 can process a variety of inputs according to predetermined rules and can send a message to frame quality evaluation processing module 10 commanding frame quality evaluation processing module 10 to transmit a certain frame to decode attempt processing module 20 based on a result of the processing by logic module 30. Inputs that can be input to logic module 30 by frame quality evaluation processing module 10 can be a quality score for each frame of a succession of frames. Inputs that can be input into logic module 30 by decode attempt processing module 20 can include a decode status, which can be based on e.g., the percent of total code words decoded from a frame, a stage of decoding of the current frame subject to decoding (e.g., searching stage, post searching stage), or the present elapsed decode frame. In response to processing such inputs, logic module 30 can message decode attempt processing module 20 to cease processing a certain frame for decoding and/or commence processing a certain frame. While apparatuses and methods described herein are useful for incorporation in a terminal capable of decoding of decodable indicia, terminal 1000 in one embodiment can be devoid of decoding processing capability.

Figure 2:
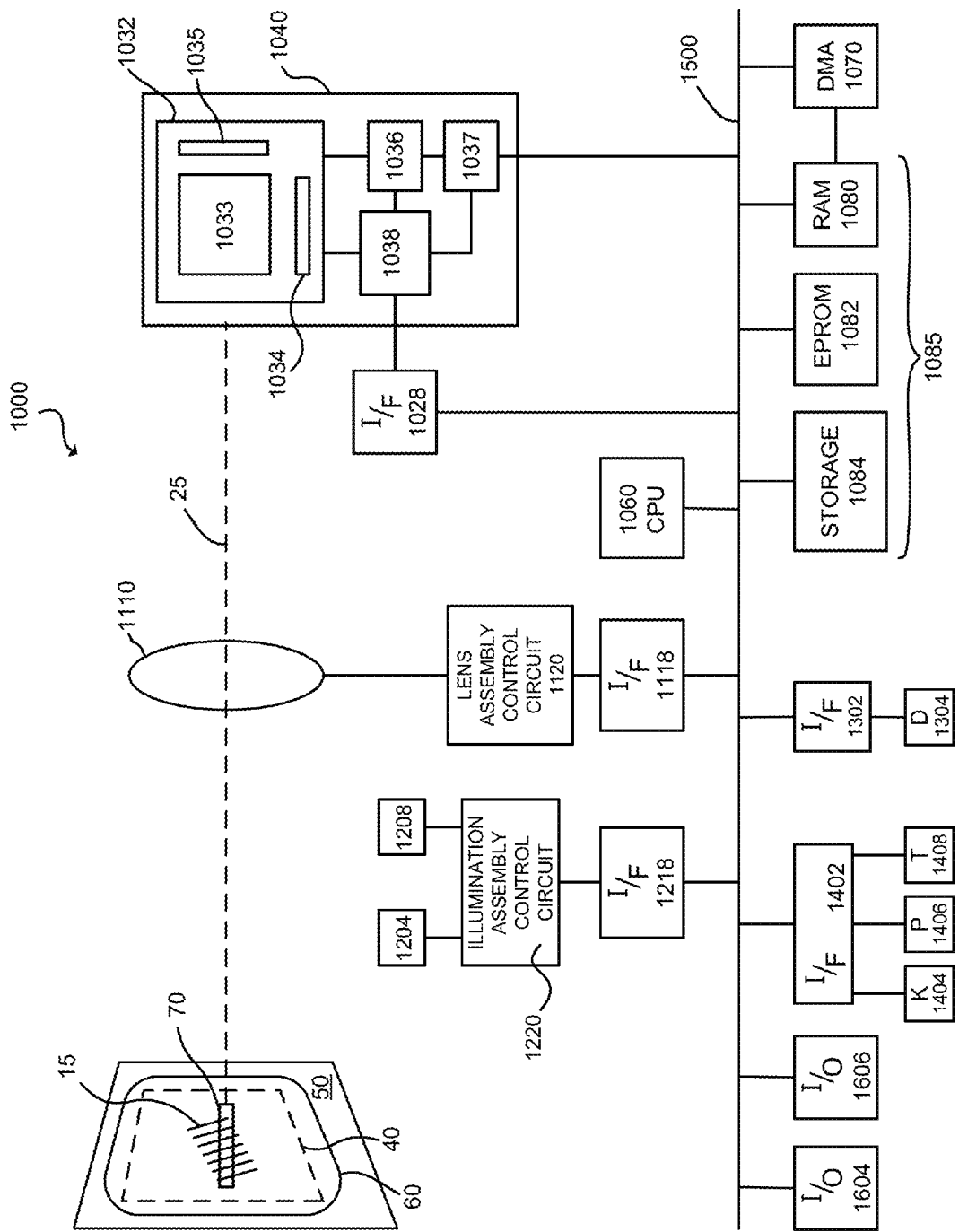
FIG. 2 is a block diagram illustrating an exemplary hardware platform for executing a method described herein.

An exemplary hardware platform for carrying out the described method is shown and described with reference to the block diagram of FIG. 2. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, terminal 1000 can include an imaging lens assembly 1110 for focusing an image of a decodable indicia located within a field of view 40 on a substrate 50 onto image sensor array 1033. Imaging light rays can be transmitted about imaging axis 25. Lens assembly 1110 can be adapted to be capable of multiple focal lengths and multiple best focus distances.

Terminal 1000 can also include an illumination pattern light source bank 1204 for generating an illumination pattern 60 substantially corresponding to a field of view 40 of terminal 1000 and an aiming pattern light source bank 1208 for generating an aiming pattern 70 on substrate 50. In use, terminal 1000 can be oriented by an operator with respect to a substrate 50 bearing decodable indicia 15 in such manner that aiming pattern 70 is projected on a decodable indicia 15. In the example of FIG. 2, decodable indicia 15 is provided by a 1D bar code symbol. Decodable indicia could also be provided by 2D bar code symbols or optical character recognition (OCR) characters. Each of illumination pattern light source bank 1204 and aiming pattern light source bank 1208 can include one or more light sources. Lens assembly 1110 can be controlled with use of lens assembly control circuit 1120 and the illumination assembly comprising illumination pattern light source bank 1204 and aiming pattern light source bank 1208 can be controlled with use of illumination assembly control circuit 1220. Lens assembly control circuit 1120 can send signals to lens assembly 1110 e.g., for changing a focal length and/or a best focus distance of lens assembly 1110. Illumination assembly control circuit 1220 can send signals to illumination pattern light source bank 1204 e.g., for changing a level of illumination output by illumination pattern light source bank 1204.

Terminal 1000 can also include a number of peripheral devices such as display 1304 for displaying such information as image frames captured with use of terminal 1000, keyboard 1404, pointing device 1406, and trigger 1408 which may be used to make active a trigger signal 702 for activating frame readout and/or certain decoding processes. Terminal 1000 can be adapted so that activation of trigger 1408 activates trigger signal 702 and initiates a decode attempt.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling lens assembly control circuit 1120 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1606 for providing communication with external devices (e.g., a cash register server, a store server, an inventory facility server, a peer terminal 1000, a local area network base station, a cellular base station). I/O interfaces 1604, 1606 can be interfaces of any combination of known computer interfaces, e.g., Ethernet (IEEE 802.3), USB, IEEE 802.11, Bluetooth, CDMA, GSM.

A succession of frames of image data that can be captured and subject to the described processing can be full frames (including pixel values corresponding to more than about 80% of pixels of image sensor 1032). A succession of frames of image data that can be captured and subject to the described processing (e.g., frame quality evaluation processing) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Referring to FIGS. 3 and 4, an imaging module 600 for supporting components of terminal 1000 can include image sensor integrated circuit 1040 disposed on a printed circuit board 1802 together with illumination pattern light source bank 1204 and aiming pattern light source bank 1208 each shown as being provided by a single light source. Imaging module 600 can also include containment 1806 for image sensor integrated circuit 1040, and housing 1810 for housing lens assembly 1110. Imaging module 600 can also include optical plate 1814 having optics for shaping light from bank 1204 and bank 1208 into predetermined patterns. Imaging module 600 can be disposed in a hand held housing 11, an example of which is shown in FIG. 5. Disposed on hand held housing 11 can be display 1304, trigger 1408, pointing device 1406, and keyboard 1404.

An example of an indicia reading terminal 1000 operating in accordance with described processing is described with reference to the timing diagram of FIG. 6. Referring to the timing diagram of FIG. 6, signal 702 is a trigger signal. Terminal 1000 can be operative so that trigger signal 702 is made active responsively to trigger 1408 being actuated and further so that trigger signal 702 remains active until the earlier of trigger 1408 being released or a predetermined number of a decodable indicia (e.g., 1) being successfully decoded. Picture taking signal 704 can be made active by the actuation of a predetermined user interface component, e.g., pointing device component 1406 of terminal 1000. In some embodiments, terminal 1000 can be operative so that terminal 1000 can be driven into a user selectable operating mode in which a picture taking signal 704 can be activated responsively to trigger 1408 being activated (the same button for use in activating trigger signal 702). Picture taking signal 704 in one embodiment, can be made active some time after a decoded message is output at time $t_g$. Exposure control signal 710 can be always active or else as in the embodiment shown in FIG. 6, terminal 1000 can be operative so that exposure control signal 710 is made active responsively to a trigger signal 702 being made active. During each exposure period e.g., period $Exp_0$, $Exp_1$, $Exp_2$, pixels of image sensor array 1033 can be exposed to light. Terminal 1000 can be operative so that after application of each exposure period $Exp_0$, $Exp_1$, $Exp_2$ a readout control pulse can be applied to image sensor 1032 for readout of voltages corresponding to charges accumulated on pixels of image sensor array 1033 during the preceding exposure period. A readout control signal 712 can comprise a series of readout control pulses as indicated in the timing diagram of FIG. 6. Subsequent to a readout control pulse, image information in the form of voltages can be amplified by amplifier 1036 converted into digital format by analog to digital converter 1037 and the converted image data can be routed by DMA unit 1070 for storage into memory 1080 which can be addressable by CPU 1060. It is seen from the timing diagram of FIG. 6 that subsequent to activation of trigger signal 702 a succession of frames can be successively stored into memory 1080 where the frames are addressable for processing by CPU 1060.

Figure 6:
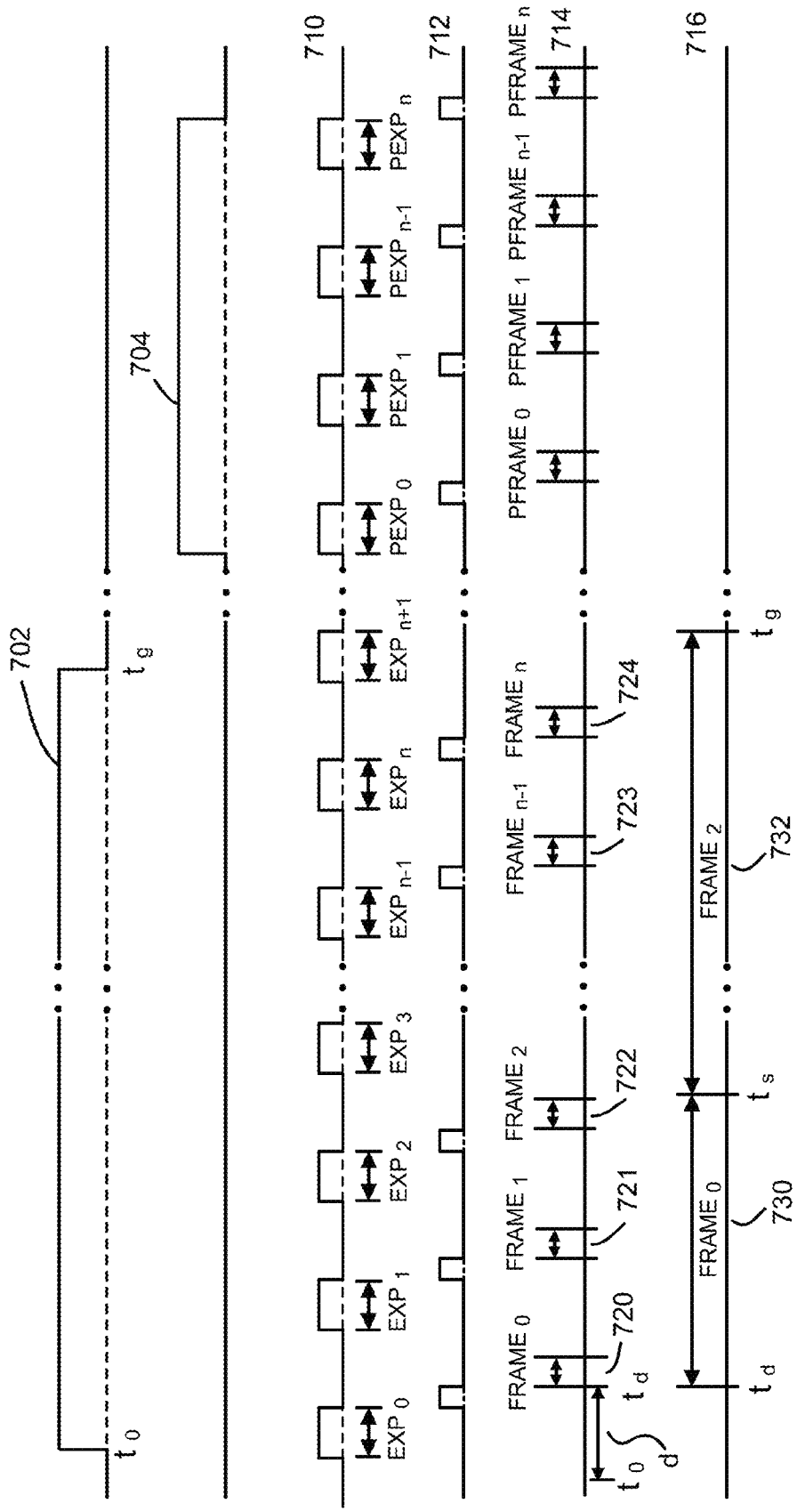
FIG. 6 is a timing diagram illustrating an embodiment of an indicia reading terminal.

Referring to the timing diagram of FIG. 6 an initial frame, $frame_0$ may not be available for processing by CPU 1060 until at time $t_d$, a delay period of time $t_d$ after initiation of trigger signal 702 at time $t_0$. According to a described processing, indicia reading terminal 1000 can be subjecting a frame of image data to image quality evaluation processing (frame quality evaluation processing) while contemporaneously subjecting a previous frame to decoding processing. Elements of image quality evaluation processing and decoding processing according to various examples will be described herein. Referring again to the timing diagram of FIG. 6, time plot 714 represents a time for processing by CPU 1060 for image quality evaluation and time plot 716 represents a time for processing by CPU 1060 for decoding. In one embodiment, CPU 1060 can run a multitasking operating system so that CPU 1060 is capable of contemporaneously running a plurality of programs by coordination of CPU processing time slices between the programs. In one embodiment, CPU 1060 can run an image quality evaluation program process represented by time plot 714 according to a first processing thread and a decode program process represented by time plot 716 according to a second processing thread. In one embodiment, frame quality evaluation processing as described herein can be devoid of an attempt to determine characters corresponding to an encoded message encoded in a decodable indicia.

Referring to the embodiment described with reference to the timing diagram of FIG. 6, terminal 1000 can be operative to subject each frame, e.g., $frame_0$, $frame_1$, $frame_2$ . . . $frame_{n-1}$, $frame_n$, of a succession of frames to image quality evaluation processing and a subset of the succession of frames to decoding processing. Further according to the described processing, terminal 1000 can be operative to maintain a recording of the result of an image quality processing for each frame subject to image quality evaluation.

In the specific example of FIG. 6, terminal 1000 can be operative to subject an initial frame, $frame_0$, to a decode attempt. However, according to the described processing, terminal 1000 can be operative to cease a decode attempt utilizing a previous frame if a result of image quality evaluation processing of a current frame satisfies a predetermined criteria. In one embodiment, such a predetermined criteria can be that the current frame has a higher quality parameter score than the frame being subject to decoding. In one embodiment, such a predetermined criteria can be that the current frame has a quality parameter score that is greater than that of a frame being subject to decoding by a predetermined threshold. In the example of the timing diagram of FIG. 6, terminal 1000 can be operative so that at time $t_0$, terminal 1000 commences decoding utilizing an initial frame, $frame_0$. However, also according to the described example, terminal 1000 can be operative to record a quality score for each of a succession of frames and hence after period 720 will have recorded a quality score for frame=$frame_0$. Terminal 1000 can be operative to compare a quality score for each new frame to a quality score for a frame currently being subject to decoding. In the described example, terminal 1000 may determine as part of processing during period 722 that frame=$frame_2$ has a quality score higher than frame=$frame_0$ currently being subject to decoding and hence may switch a frame subject to a decode attempt to frame=$frame_2$ having the higher quality score, or a quality score that is higher by a predetermined threshold. As shown in the timing diagram of FIG. 6, CPU 1060 at time $t_s$ switches to decoding utilizing frame=$frame_2$ when determining that frame=$frame_2$ has a higher quality score than frame=$frame_0$.

It should be noted that when switching to decoding a new frame (i.e., the switch from frame=$frame_0$ to frame=$frame_2$) terminal 1000 may not discard the results of decoding the previous frame. For example, in some instances, a decodable indicia subject to decoding can be a bar code of a symbology type that can be decodable to output code words. Code words of a bar code symbol are not complete decoded messages of a bar code symbol but can be combined with other code words of a bar code symbol to provide a complete decoded message. A decoded code word of a bar code symbol may be regarded as a partially decoded message. Symbologies which may be decoded to provide code words representing a partial decoded message of a bar code symbol include PDF 417, UPC, Datamatrix, QR code, and Aztec, etc. Terminal 1000 can be operative to accumulate partially decoded messages determined by processing a set of subject frames until a decoded message for a symbol is determined.

With reference to the example of FIG. 6, it was described that a decision to cease decoding processing a frame currently being subject to decode processing can be responsive to a quality score for a new frame (i.e., if the quality score for a new frame is higher than a frame currently being subject to decode processing, decoding can be ceased for the frame being subject to decoding).

In some embodiments, a decision to cease decoding processing of a certain frame can be responsive to a decode status. As indicated in FIG. 1, decode attempt processing module 20 can report a decode status to logic module 30. Terminal 1000 can be configured so that terminal 1000 is restricted from ceasing decode processing for a certain frame if a decode status indicates that decoding is nearly complete according to a predetermined criteria. Decode status can be indicated by a variety of different indicators. For example, for code word based bar code symbols, a percentage of total code words decoded can be used as a decode status indicator, with a percentage above a threshold indicating a nearly complete status. A decode stage (e.g., searching or post-searching) status can be used as an indicator with a post searching stage indicating a nearly complete status. An elapsed decode time can also be used as a decode status indicator with an elapsed time being above a threshold indicating a nearly complete status.

For decoding bar code decodable indicia of certain symbologies, CPU 1060 can be adapted to combine partial decoded out results determined from two or more different frames. A partial decode result provided by decoding a frame of image data can take the form of a set of code words. CPU 1060 can be adapted to determine a first set of code words by processing a certain frame of a set of frames while a trigger signal 702 is active and to combine the first set of code words with a second set of code words determined by processing of a subsequent frame while the trigger signal 702 remains active. In one embodiment, CPU 1060 can be adapted so that CPU 1060 can process a certain frame to determine a first set of code words, a subsequent frame to provide a second set of code words, and possibly M further subsequent frames to provide a third set of code words. CPU 1060 can further be adapted to combine the first, second, and possible M additional sets of code words to provide a decoded message. For example, with reference to the timing diagram of FIG. 6, CPU 1060 may process frame=$frame_0$ to determine a first set of code words and then process frame=$frame_2$ to determine a second set of code words and then combine the code words to provide a decoded message output after time $t_g$.

In one embodiment, the processing at periods 720, 721, 722, 723, 724 for image quality evaluation can be restricted from consuming more than a predetermined period of time. In one embodiment, the predetermined time period is a time period of less than one frame period. In such manner, CPU 1060 is assured of completing quality evaluation for a certain frame, frame=$frame_j$ prior to a time that a successive frame, frame=$frame_{j+1}$, is available for processing by CPU 1060.

In one specific embodiment, with reference to time plot 714 of FIG. 6, the time periods for processing 720, 721, 722, 723, and 724 can be substantially fixed. Where a time period for processing at periods 720, 721, 722, 723, and 724 is restricted from consuming a time period greater than a frame time, CPU 1060 can determine a quality score of a frame prior to a time that a succeeding frame of image data is available for processing by CPU 1060. In one embodiment, where terminal 1000 has a frame time for a succession of frames of 16.6 ms, terminal 1000 can be operational so that processing periods 720, 721, 722, 723, and 724 are restricted from consuming a time period of more than 10 ms, and in another embodiment terminal 1000 can be operational so that processing periods 720, 721, 722, 723, and 724 are restricted from consuming a processing period of more than 5 ms.

Figure 7:
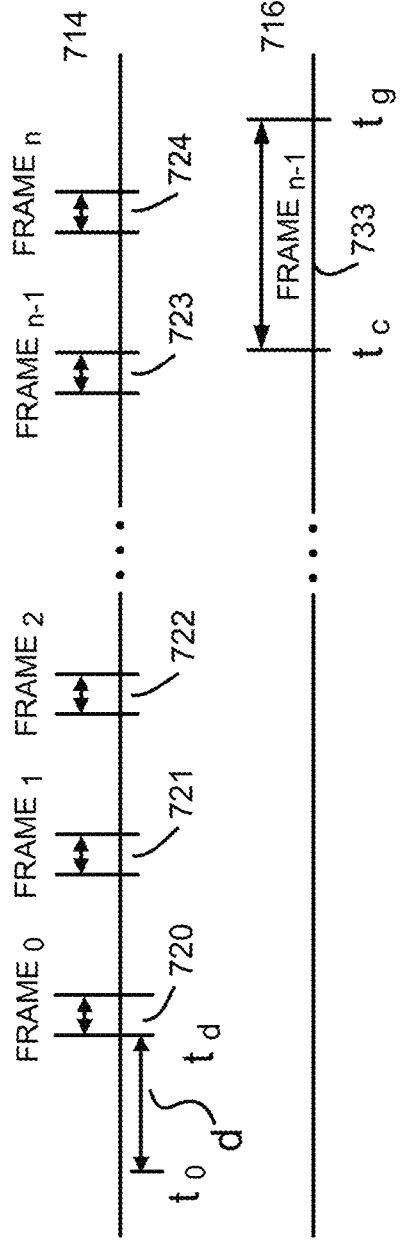
FIG. 7 is a timing diagram illustrating an embodiment of an indicia reading terminal.

Another illustrative example of a described processing is described with reference to FIG. 7. In the example of the timing diagram of FIG. 7, signals 702, 704, 710, 712 are the same in relation to the processing periods 720, 721, 722, 723, 724, but not included for simplification purposes. According to the timing diagram of FIG. 7, CPU 1060 is restricted from executing decoding processing for a frame until a quality evaluation result for a certain frame satisfies a predetermined criteria. Such a predetermined criteria may be that a certain frame has a quality score above a threshold quality score. Referring to the timing diagram of FIG. 7, CPU 1060 can be operative to subject each frame of a succession of frames to a quality evaluation processing and can further be operative to attempt to decode a certain frame conditionally on the condition that a result of the quality evaluation processing satisfies a predetermined criteria e.g., a quality score above a threshold. In the described example of the timing diagram of FIG. 7, CPU 1060 may determine per the quality evaluation processing represented by time plot 714 that a quality score for each of frames frame=$frame_0$, frame=$frame_1$, frame=$frame_2$, is below a threshold. However, during processing period 723, CPU 1060 can determine that a quality score for frame=$frame_{n-1}$ is above a threshold. According to a described processing, CPU 1060 thereafter beginning at time $t_c$ for a period 733 can subject frame=$frame_{n-1}$ to a decode attempt.

Variations of processing for quality evaluation and for decoding are now described. In one example, for evaluating a frame of image data for quality, CPU 1060 can apply a filter set to a frame of image data. For example, the edgelet detector filter set below can be applied.

$$\begin{bmatrix} 1 & 1 \\ -1 & -1 \end{bmatrix} \begin{bmatrix} -1 & 1 \\ -1 & 1 \end{bmatrix} \begin{bmatrix} 1 & 1 \\ -1 & 1 \end{bmatrix} \begin{bmatrix} 1 & 1 \\ 1 & -1 \end{bmatrix} \begin{bmatrix} 1 & -1 \\ 1 & 1 \end{bmatrix} \begin{bmatrix} -1 & 1 \\ 1 & 1 \end{bmatrix}$$

Figure 9:
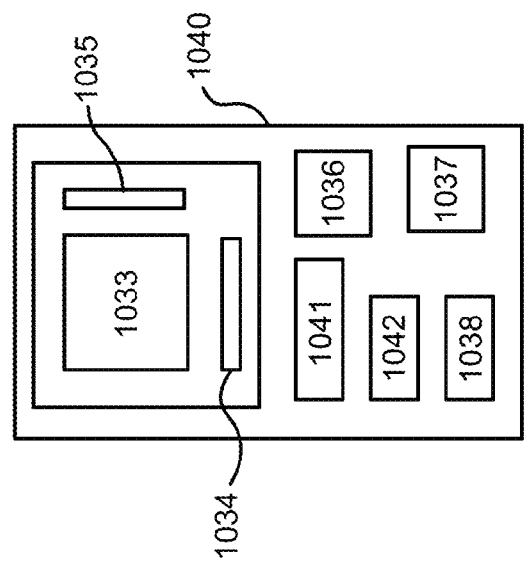
FIG. 9 is a block electrical diagram illustrating alternative hardware that can be incorporated into an indicia reading terminal.

Terminal 1000 can convolve each pixel value of a sample of pixel values with each of the above edgelets to determine an edge strength score for each pixel position of a frame. Edge strength scores for pixel positions of a sample can be summed for determining a quality score for a frame. Other calculations can be applied utilizing edge strength scores to determine alternative quality score statistics. In another aspect, texture filters need not be applied by CPU 1060 with reference to stored frames of image data that are stored in a CPU addressable memory. For example, as shown in FIG. 9, image sensor integrated circuit 1040 can be modified to include N row buffer 1041 and N×N mask filter circuit 1042. Filters can be applied to image data as it is read out of integrated circuit 1040, the results can be accumulated, and data indicating a result of a frame quality evaluation can be reported in a reference data location (e.g., a header or footer) of each frame. In such an embodiment, processing of image information (e.g., filter mask related calculations) for evaluating a quality of a frame of image data can be carried out by circuitry of terminal 1000 other than CPU 1060 prior to storage of a frame of image data into RAM 1080. The processing required by CPU 1060 in such an embodiment for evaluating a quality of a frame of image data can comprise reading of the data of the reference data location, which processing requires a processing time of only a fraction of a frame time. In other embodiments, terminal 1000 can be operative so that CPU 1060 performs calculations for frame quality evaluation processing, e.g., application of edgelet filter masks, autocorrelation calculations utilizing sampling path data as described herein. Pixel values can be sampled more closely at a center of a frame (where a decodable indicia representation is more likely to be than at a frame boundary).

Figure 10:
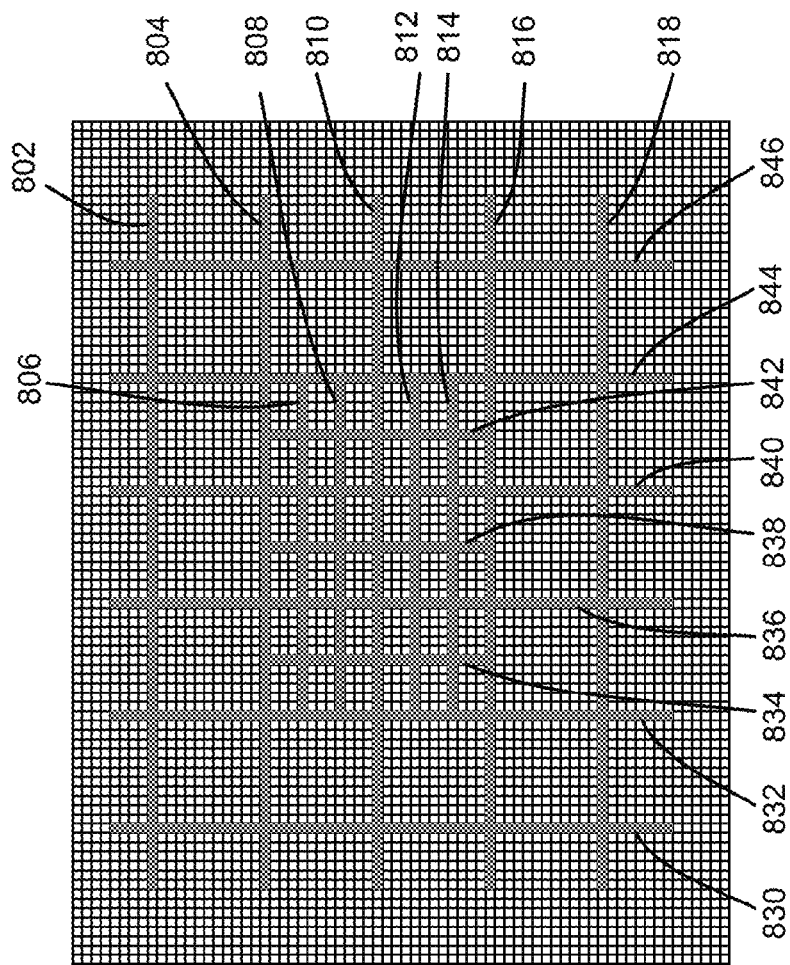
FIG. 10 is an image map illustrating pixel positions and sampling paths comprising pixel positions which can be sampled in one embodiment of an indicia reading terminal.

In another example, quality evaluation processing can comprise sampling a frame of image data along a plurality of sampling paths and calculating autocorrelation scores for each of the sampling paths. In one example, sampling paths 802, 804, 806, 808, 810, 812, 814, 816, 818, 830, 832, 834, 836, 838, 840, 842, 844, 846 can be selected, as are indicated in FIG. 10, where the sampling paths are more closely spaced toward a center of a frame. Autocorrelation scores for each path can be determined according to the formula:

$$S_{path} = \Sigma(I_n - I_{n-1})^2 \qquad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \qquad \text{Equation 2}$$

Further according to a process for evaluating a quality of a frame of image data, a quality score for a frame of image data can be determined utilizing autocorrelation scores for the paths 802, 804, 806, 808, 810, 812, 814, 816, 818, 830, 832, 834, 836, 838, 840, 842, 844, 846. In one example, a sum of autocorrelation scores for a frame can be taken as a measure of a quality of a frame.

Using either of the described methods including application of edgelet filters or including calculating autocorrelation scores for sampling paths, it is seen that either of an increased incidence of or sharpness of edge representations in a time frame will result in an increased quality score for a frame.

Referring now to processes that can be carried out by processing module 20 during, e.g., periods 730, 732 (FIG. 6) and period 733 (FIG. 7) CPU 1060, appropriately programmed can carry out a decoding process for attempting to decode a frame of image data. For attempting to decode a frame of image data, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message.

Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

In one embodiment, terminal 1000 can incorporate a multi-tasking operating system, and CPU 1060 can be programmed to contemporaneously execute, as part of separate processing threads, the described (a) frame quality evaluation processing and (b) decoding processing. However, whereas terminal 1000 can be operative so that frame quality evaluation processing is restricted from consuming more than one frame time, decode attempt (decoding) processing for attempting to extract a decoded message can, in one embodiment, consume more than one frame time. Accordingly, at a time CPU 1060 commences processing of a certain frame, frame=$frame_j$ for frame quality evaluation, CPU 1060 may be processing a previous frame, $frame_{j-k}$, $k \geq 1$ for decoding. Referring to the timing diagram of FIG. 6, CPU 1060 can, in accordance with a first thread at period 723, be subjecting frame=$frame_{n-1}$ to frame quality evaluation processing while CPU 1060 in accordance with a second thread at overlapping period 732, can be processing $frame_2$ for attempting to decode.

Figure 8:
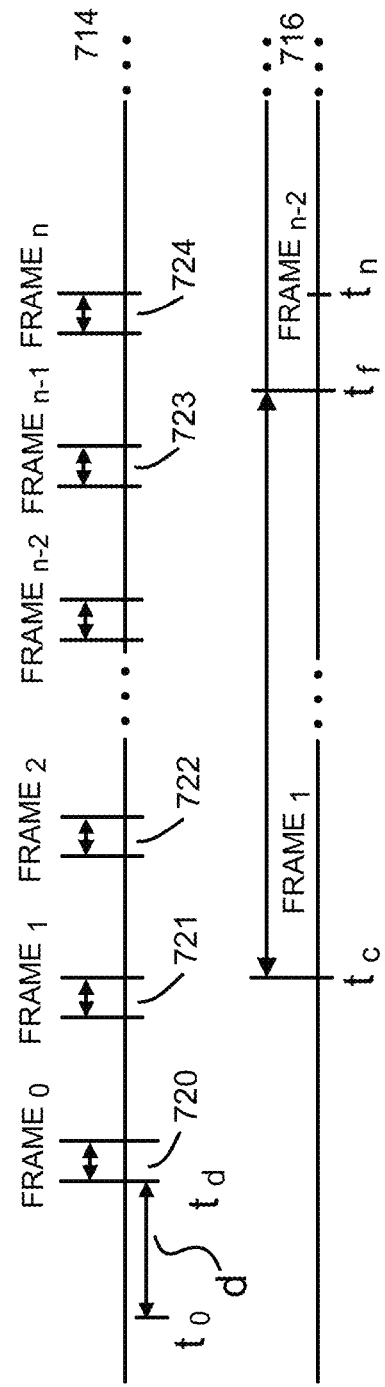
FIG. 8 is a timing diagram illustrating an embodiment of an indicia reading terminal.

In another exemplary embodiment described with reference to FIG. 8, terminal 1000 can be operative to utilize frame quality evaluation processing for selecting for decoding processing a frame stored prior to terminal 1000 determining that there has been a decode failure. With reference to FIG. 8, CPU 1060 in one example can commence decoding $frame_1$ at time $t_c$ and can continue to attempt to decode frame=$frame_1$ until terminal 1000 determines that decoding has failed for that frame at time $t_f$. In one example, terminal 1000 can determine that decoding has failed by reaching a timeout period without successfully decoding a decodable indicia. In one example, terminal 1000 can be operative so that when determining that decoding has failed at time $t_f$, terminal 1000 can select for decoding processing a frame that was stored prior to the decode failure determination time, time=$t_f$. In one example, terminal 1000 can continuously buffer a predetermined number of frames that are captured (e.g., the last W successively captured frames can always be buffered). Terminal 1000 can be configured so that on determining that decoding has failed for a certain frame, terminal 1000 utilizes quality scores of the buffered frames to select for decoding one of the buffered frames. In the example of FIG. 8, where terminal 1000 determines at time $t_f$ that decoding has failed for frame=frame$_1$, terminal 1000 thereafter can select frame=frame$_{n-2}$, on determining that frame=frame$_{n-2}$ has the highest quality score of all buffered frames buffered between time $t_c$ and time $t_f$. The selected frame=frame$_{n-2}$ has already been stored at time=$t_f$. In a variation with reference to the described example, terminal 1000 after time $t_f$ can wait until a quality score for a next frame has been determined at time=$t_n$, and can select for decoding processing after time=$t_f$, the frame yielding the highest quality score out of all frames captured between times $t_c$ and $t_n$. In the example of FIG. 8, signal 702, signal 710, signal 712 can be the same as shown in relation to time plot 714 as shown in FIG. 6, but are not shown in FIG. 8 for purposes of simplification. It has been described herein that terminal 1000 can buffer a plurality of frames for selection of a next frame for subjecting to a decode attempt. In one embodiment, terminal 1000 can examine frames prior to buffering, and can discard frames prior to buffering if frames do not satisfy a predetermined criteria indicating a baseline level of quality. In such manner the quality of frames that are subject to buffering can be increased.

In one embodiment, frame quality evaluation processing can be utilized when terminal 1000 is controlled for selectively outputting a frame of image data. A frame can be selectively output e.g., by storing a frame to an onboard or external non-volatile memory and/or by displaying a frame to an onboard or external display. From time to time terminal 1000 can be controlled to selectively output a frame for display. For example, an operator may wish to subject to persistent storage or display, e.g., a frame representing a package or other article being shipped, an article bearing a decodable indicia, a person such as a delivery agent, or package recipient, or a customer at a point of sale, a shipping truck, etc. Referring to the timing diagram of FIG. 6, a selectively output frame can be selectively output responsively to activation of picture taking signal 704. Terminal 1000 can be adapted so that picture taking signal 704 can be made active in response to actuation of pointing device 1406 of terminal 1000 or other user interface component. Terminal 1000 can be operative so that when picture taking signal 704 is made active, a frame currently stored in memory 1080 is written for storage to non-volatile storage memory 1084 and/or transmitted to an external CPU-equipped terminal for storage in a non-volatile memory thereof, and/or written to display 1304 and/or transmitted to an external CPU-equipped terminal for display on a display thereof.

In one embodiment, terminal 1000 can be operative so that in response to a picture taking signal 704 being made active, a predetermined number of frames e.g., 10 frames are captured. Terminal 1000 can also be operative so that in response to picture taking signal 704 being made active, terminal 1000 selects the frame out of the predetermined number of frames having the highest quality score for selective output. The inventors recognized that quality evaluation processing described herein, where quality is responsive to an incidence and/or sharpness of edge representations can be a good indicator of visual quality as well as quality for decoding purposes. Referring to the timing diagram of FIG. 6, terminal 1000 can be operative so that in response to picture taking signal 704 being made active, terminal 1000 can buffer the frames captured during the activation period of picture taking signal 704 and can selectively output the buffered frame having the highest quality score during the activation period of picture taking signal 704. Thus, in reference to timing diagram of FIG. 6, terminal 1000 can archive frame=Pframe$_{n-1}$ if terminal 1000 determines that frame=Pframe$_{n-1}$ has the highest quality score of any buffered frame captured during activation period of picture taking signal 704.

In some operating modes, terminal 1000 can be made to selectively output a frame of image data responsively to a trigger signal 702 being made active for initiating decoding processing. Terminal 1000 can be adapted so that trigger signal 702 can be made active in response to an actuation of trigger 1408 or another user interface component of terminal 1000. It is seen from the timing diagram of FIG. 6 that decode attempt processing may not be made active in response to picture taking signal 704 being made active. However, decoding processing as illustrated by time plot 716 can ensue subsequent to trigger signal 702 being made active. When terminal 1000 is operative in a mode in which terminal 1000 selectively outputs a frame responsively to trigger signal 702 being made active, terminal 1000 can utilize quality scores of frames captured when trigger signal 702 is made active for determining which of a set of frames to selectively output, e.g., by storing to a non-volatile memory and/or display on a display. In one embodiment, terminal 1000 can be operative so that responsively to trigger signal 702 being made active, terminal 1000 buffers the frames captured during the time that trigger signal 702 is made active and selectively outputs the captured frame captured during the active period of trigger signal 702 having the highest quality score. By way of such processing, it is seen that a frame selected may be a frame other than a frame subject to decode processing. For example, frame=frame$_n$ may be the frame having the highest quality score and the frame selected for selective output. However, frame=frame$_n$ may not be subject to decode processing if a previous frame, frame=frame$_{n-b, b \geq 1}$ is successfully decoded, and logic module 30 is configured so that the detection of the higher quality score for frame=frame$_n$ does not cause a ceasing of the decode attempt utilizing frame=frame$_{n-b, b \geq 1}$.

In one embodiment, terminal 1000 can be operative so that frame quality evaluation processing algorithms applied can be differentiated depending on whether a frame is output for display or archiving responsive to (a) trigger signal or (b) picture signal being activated. For example, when the output is in reference to trigger signal 702, a center weighted sampling path format can be used as shown in FIG. 10 when the output is in response to trigger signal 702, a uniformly distributed sample path forward can be chosen. It has been described that terminal 1000 can buffer a plurality of frames for purposes of selectively outputting a frame of image data. In one embodiment, terminal 1000 can examine frames prior to buffering, and can discard frames prior to buffering if frames do not satisfy a predetermined criteria indicating a baseline level of quality. In such manner the quality of frames that are subject to buffering can be increased.

Referring now to further aspects of terminal 1000, an additional feature of terminal 1000 in one embodiment is now described. In one embodiment, frame quality evaluation processing module 10 can input to logic module 30 a location of a decodable indicia in each frame of a succession of captured frames. Such a location can be referred to as a region of interest (ROI). Logic module 30 in turn can be configured to report the determined ROI location to decode attempt processing module 20, when logic module 30 messages decode attempt processing module 20 to commence decode processing of a frame designated for decoding (a designated decode frame). Accordingly, for a certain frame of a succession of frames, frame quality evaluation processing module 10 can determine a ROI for the certain frame, and decode attempt processing module 20 can utilize the ROI for attempting to decode the certain frame. In such manner, the speed of processing for decoding of a certain frame can be significantly increased as the processing stage of searching can be avoided. The manner in which CPU 1060 can determine a location of decodable indicia as part of a frame quality processing is now described. It is noted that as part of determining a quality score for a frame, CPU 1060 can calculate autocorrelation scores for each sampling path. In another aspect, the sampling path or paths yielding the highest autocorrelation score(s) are the path(s) including a representation of a decodable indicia. The path yielding the highest autocorrelation scores will generally be the paths intersecting the greatest number of (and/or the sharpest) edge representations.

Accordingly, in one specific example, a location of a decodable indicia in a frame of image data can be determined, as part of a frame quality evaluation processing described herein, by subjecting a plurality of horizontal and vertical sampling paths to an autocorrelation function, selecting the sampling paths yielding the highest autocorrelation score(s) as the paths representing a decodable indicia, and in one embodiment, further processing the path data as described herein. In one embodiment, CPU 1060 after calculating autocorrelation scores for various sampling paths can further process path data for further discrimination of a location of a decodable indicia representation along a path. In one embodiment, selected paths selected as yielding the highest autodiscrimination scores and indicating an intersection of decodable indicia representations can be subjected to processing for classifying path image data as either background image data or decodable indicia image data. In one example, for performance of such classification, terminal 1000 can binarize image data along each selected sampling path. For binarization, path pixel value image data can be compared to a threshold and all pixel values below the threshold can be classified as decodable indicia, and all pixel values above the threshold can be classified as background. A mean value of a path can be selected as a threshold, or the threshold can be selected according to $T=\frac{1}{2}(I_{max}+I_{min})$. In another example, Otsu's algorithm can be utilized for determination of the threshold. Segments of a sampling path characterized by a high density of decodable indicia can be classified as decodable indicia segments. Image data at a location determined to include a decodable indicia representation can include image data defining dark portions of a decodable indicia and image data at pixel positions about such indicia.

An indicia reading terminal configured as described herein is particularly well suited for decoding a decodable indicia disposed on a vibrating substrate. For example, in one commonly encountered type of scene substrate 50 as shown in FIG. 2 can be e.g., a motorized machine or an article carried on a motorized machine such as a motor vehicle. When an object vibrates, the object's motion is sinusoidal. A vibrating object's motion generally varies between a motion phase, a stop phase followed by another motion phase, followed by another stop phase, and so on. With a hand held indicia reading terminal as described herein directed toward a vibrating substrate having certain vibration characteristics that bears a decodable indicia, a trigger signal can be activated and in response to such activation a certain frame of a succession of frames can be selected for a subjecting to a decode attempt. By subjecting a succession of frames to frame quality evaluation processing as described herein in one embodiment, motion frames having exposure periods corresponding to a motion phase of a substrate can be discriminated from stop frames having exposure periods proximate a stop phase of the substrate. Motion frames can be expected to be characterized by significant blur, and therefore can be expected to have quality scores lower than stop frames when subjected to the frame quality evaluation processing. Accordingly, if terminal 1000 is configured to cease processing a previous frame on the condition that a current frame has a quality score that exceeds that of the previous frame by a threshold such as a predetermined threshold, terminal 1000 can successfully discriminate between motion frames and stop frames, and can select for subjecting to a decode attempt a stop frame (expected to have a relatively high quality score) irrespective of whether the stop frame is an initial frame available for decoding or whether the stop frame is preceded by a plurality of frames available for decoding. Terminal 1000 accordingly can utilize a result of discriminating between motion and stop frames for selection of a frame for subjecting to decoding. Motion frames having quality scores relatively lower than stop frames can likewise be rejected as frames for subjecting to decoding.

EXAMPLE 1

A hand held indicia reading terminal having an image sensor and an imaging lens for use in focusing images onto the image sensor was configured to subject a succession of frames to the frame quality processing described herein so that when a trigger signal is activated the terminal would subject a succession of frames to frame quality evaluation processing and cease subjecting to a decode attempt a previous frame if a current frame has a quality score that exceeds that of the previous frame by a predetermined threshold. The hand held indicia reading terminal was directed at a vibrating substrate that bears a UPC symbol so that the field of view of the terminal includes the UPC symbol. The terminal was held at a constant distance from the vibrating substrate within 3 inches of a best focus distance of the terminal. The UPC symbol was illuminated at about 120 lux. The substrate was vibrated at 890 rpm horizontally with an amplitude of about ⅝ of an inch. The indicia reading terminal was held at a constant distance from the vibrating substrate. A trigger signal was successively activated ten times by successive actuations of the indicia reading terminal's trigger. The UPC symbol was successfully decoded ten (10) times within eight (8) seconds. The terminal was modified so that the frame quality evaluation processing described herein was disabled. A trigger signal was successively activated ten (10) times by successive activations of the indicia reading terminal's trigger. Thirty-eight (38) seconds were consumed before the indicia reading terminal successfully decoded the symbol ten times.

End of Example 1

EXAMPLE 2

The experiment was repeated disposing a QR Code symbol on the vibrating substrate, with remaining controls maintained as described in Example 1. In response to ten (10) successive trigger signal activations, the QR Code symbol was decoded ten (10) times within fifteen (15) seconds. The experiment was repeated disabling frame quality evaluation processing as described herein. A trigger signal was successively activated ten times by successive actuation of the terminal's trigger. Decode times for decoding the QR Code symbol ten times ranged from 48.1 seconds to 99.8 seconds.

End of Example 2

In one embodiment, terminal 1000 can be operative to incorporate, in addition to or as an alternative to the processing functionality described herein above. In another embodiment, terminal 1000 can be operative to incorporate, in addition to or as an alternative to the processing functionality described in co-pending U.S. patent application Ser. No. 12/242,244, entitled "Method And Apparatus For Operating Indicia Reading Terminal Including Parameter Determination" filed Sep. 30, 2008 and incorporated herein by reference in its entirety. In one embodiment, the context determination processing, the quality determination processing, and parameter determination processing described in the referenced U.S. patent application Ser. No. 12/242,244, which can be carried out on a possibly time-restricted, and per frame basis for a succession of frames, can be carried out as part of the described possibly per frame and possibly time restricted frame quality evaluation processing as described herein above. Accordingly, in one example, terminal 1000 can be adapted so that terminal 1000 within a time restricted time for each of a succession of frames, can carry out each of quality evaluation processing and ROI determination as described herein as well as context detection processing and parameter determination processing as described in referenced U.S. patent application Ser. No. 12/242,244. Excerpts referenced in U.S. patent application Ser. No. 12/242,244 are presented herein below with figure enumerations changed to avoid duplication.

Figure 11:
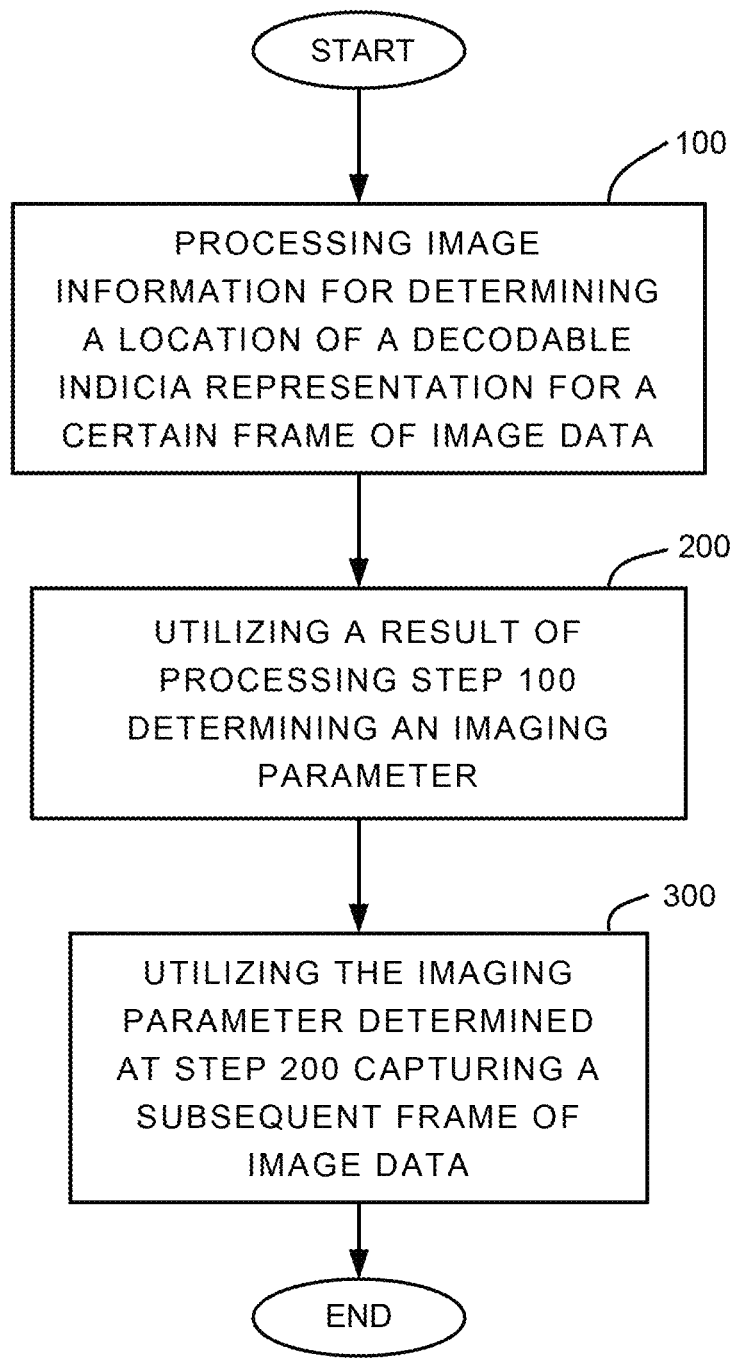
FIG. 11 is a flow diagram illustrating a method for operation with use of an indicia reading terminal.

Referring to the flow diagram of FIG. 11, a method is provided in one example which includes the steps of at block 100 processing image information for determining a location of a decodable indicia representation for a certain frame of image data; at block 200 utilizing a result of the processing for determining an imaging parameter; and at block 300 utilizing the imaging parameter for capture of a subsequent frame. The method provides for fast capture of a frame of image data that can be processed for decoding even in cases where a scene subject to image capture has large white areas or large dark areas outside of a location of a decodable indicia. The method also provides for fast capture of a frame of image data of high visual quality. In one embodiment, the method can be executed a number of times in succession (each time relative to a new frame in a succession of frames) in response to activation of a trigger signal until a frame is successfully decoded or until a time that a trigger signal is deactivated.

A generic description of a method having been described with reference to the flow diagram of FIG. 11, specific examples of the various method blocks are now described.

Figure 12:
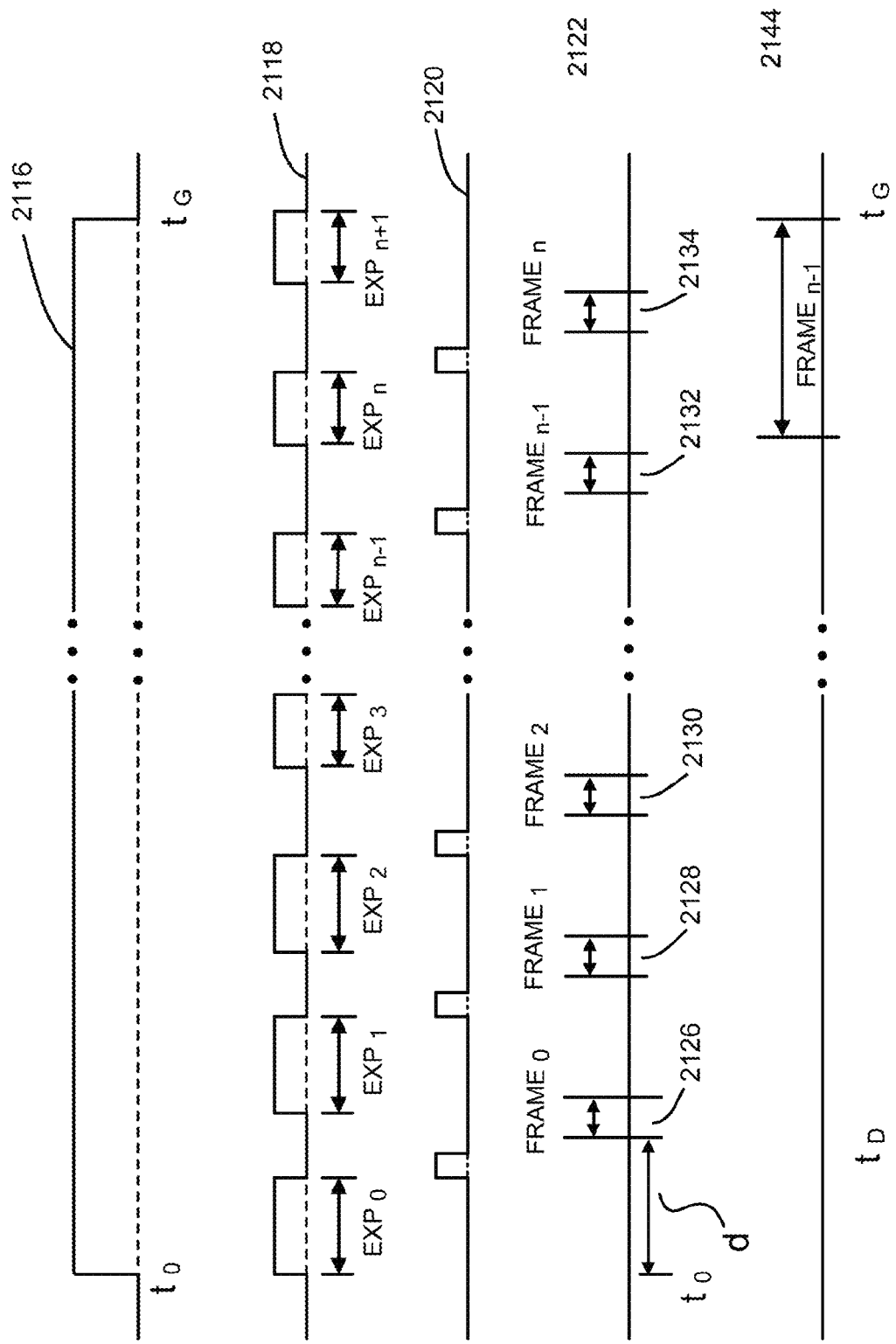
FIG. 12 is timing diagram illustrating exemplary operation of an indicia reading terminal.

A specific example of step 100 (processing image information for determining a location of a decodable indicia) is described with reference to the timing diagram of FIG. 12 and the image map diagram of FIG. 13.

At block 100, terminal 1000 in one embodiment, can process image information for determining a location of decodable indicia by completing capturing of a frame of image data by storage of a frame into RAM 1080, where it is addressable by CPU 1060 and subjecting the stored frame of image data to processing. An exemplary method for capturing image data for processing by CPU 1060 is described with reference to the timing diagram of FIG. 12. At time $t_0$ trigger 1408 may be actuated to make active a trigger signal 2016 which may remain active until the earlier of trigger 1408 being released or a predetermined number of (e.g., 1) decodable indicia being successfully decoded (in the example of the timing diagram of FIG. 12, trigger signal 2016 is automatically deactivated at time, $t_G$, when an indicia representation is successfully decoded). Terminal 1000 can be adapted so that terminal 1000 continuously captures and processes a succession of frames for a time that trigger signal 2016 remains active. Terminal 1000 can be adapted so that in response to a trigger signal being made active, an exposure control timing pulse signal 2118 is applied to image sensor 1032 to expose pixels of image sensor array 1033. After a trigger signal is made active, there can be a succession of exposure periods $Exp_0$, $Exp_1$, $Exp_2$, $Exp_3$, . . . each corresponding to a frame in a succession of frames, and each defined by a pulse of exposure control signal 2118.

Following each exposure period $Exp_0$, $Exp_1$, $Exp_2$, $Exp_3$ . . . image information in the form of voltage signals can be read out from image sensor 1032. The readout of image information from image sensor 1032 can be in response to applications of readout control pulses of readout control signal 2120 as shown in the timing diagram of FIG. 12. Image information which has been subject to conversion by analog to digital converter 1037 can be routed into memory 1085 via DMA unit 1070 where it is available for processing by CPU 1060. Referring to the timing diagram of FIG. 12, time plot 2122 indicates the times within which CPU 1060 can process, for determining a location of a decodable indicia, a certain frame of image data out of a series of frames captured in response to activation of a trigger signal 2016. It is seen from time plot 2122 that processing by CPU 1060 for determining a location of a decodable indicia as part of block 100 can be carried out iteratively for each frame of a succession of frames. Because of processing delays, CPU 1060 may not commence processing an initial frame, $frame_0$, until during period 2126, a delay of time "d" after a trigger signal is made active at time $t_0$. Within processing periods 2126, 2128, 2130, 2132, 2134, CPU 1060 can carry out further processing with respect to a current frame, e.g., determining an imaging parameter (block 200) and determining a frame's quality as will be described herein.

A succession of frames of image data that can be captured and subject to the described processing can be full frames (including pixel values corresponding to more than about 80% of pixels of image sensor 1032). A succession of frames of image data that can be captured and subject to the described processing (e.g., context processing, parameter determination, decoding) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

After a frame of image data is captured at block 100 by storage into RAM 1080, the frame of image data can be subject to context detection for determining a location of a decodable indicia representation. At block 100, for context detection, a frame of image data can be sampled along a plurality of sampling paths. A representation of a frame of image data is shown in FIG. 13 where various pixel positions corresponding to pixels of image sensor 1032 are represented in a matrix array of pixel positions. A plurality of sampling paths in one example can comprise a plurality of horizontal sampling paths 2202, 2204, 2206, 2208, 2210, 2212, 2214, comprising pixel values along spaced apart rows of pixels. A plurality of sampling paths can also include a plurality of vertical sampling paths 2226, 2228, 2230, 2232, 2234, 2236, 2238, 2240, 2242, 2244 comprising pixel values of spaced apart columns of pixel values. Each sampling path 2202, 2204, 2206, 2208, 2210, 2212, 2214, 2226, 2228, 2230, 2232, 2234, 2236, 2238, 2240, 2242, and 2244 can comprise pixel values corresponding to a set of pixel positions, where each pixel position is positionally adjacent to one or two pixel positions of the set.

Further, for processing a frame of image data for context detection, an autocorrelation function can be applied to sampled image data. In one example, an autocorrelation function can be applied utilizing image data of the sampling path. An autocorrelation function for a sampling path can comprise the formula $$S_{path} = \Sigma(I_n - I_{n-1})^2 \qquad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \qquad \text{Equation 2}$$

From the formulas of Equation 1 and Equation 2, it is seen that sampling paths that intersect representations of decodable indicia will likely include higher autocorrelation scores than those that do not include decodable indicia representations (where no decodable indicia representation is included along a sampling path and the sampling path comprises similar valued pixel values, the autocorrelation function will be relatively low; however, high autocorrelation scores will result when a sampling path intersects a decodable indicia representation including a plurality of dark/light transitions). Accordingly, a high autocorrelation score for a sampling path will serve as an indication that a sampling path is likely to have intersected a decodable indicia representation.

Further at block 100, high autocorrelation scores (those indicating the inclusion of a decodable indicia representation) can be discriminated from low autocorrelation scores (those indicating the absence of a decodable indicia representation) along a sampling path. For performance of such discrimination, the sampling path or paths yielding the highest autocorrelation score(s) can be selected as the path or paths indicating that a decodable indicia is represented. For example, the horizontal sampling path yielding the highest autocorrelation score in the horizontal direction, and the vertical sampling path yielding the highest autocorrelation score in the vertical direction can be selected as paths that indicate that a decodable indicia is represented. Also, autocorrelation scores can be subject to a threshold. Those scores above a threshold can be regarded as indicating that image data utilized for the calculation includes a decodable indicia representation and those under a threshold can be regarded as indicating that image data utilized for the calculation does not include a decodable indicia representation. Such a threshold can be predetermined and fixed or can be variable and dynamically determined.

Accordingly, in one specific example described with reference to the flow diagram of FIG. 11, a location of a decodable indicia in a frame of image data can be determined by subjecting a plurality of horizontal and vertical sampling paths to an autocorrelation function, and selecting the sampling paths yielding the highest autocorrelation score(s) as the paths representing a decodable indicia.

Figure 13:
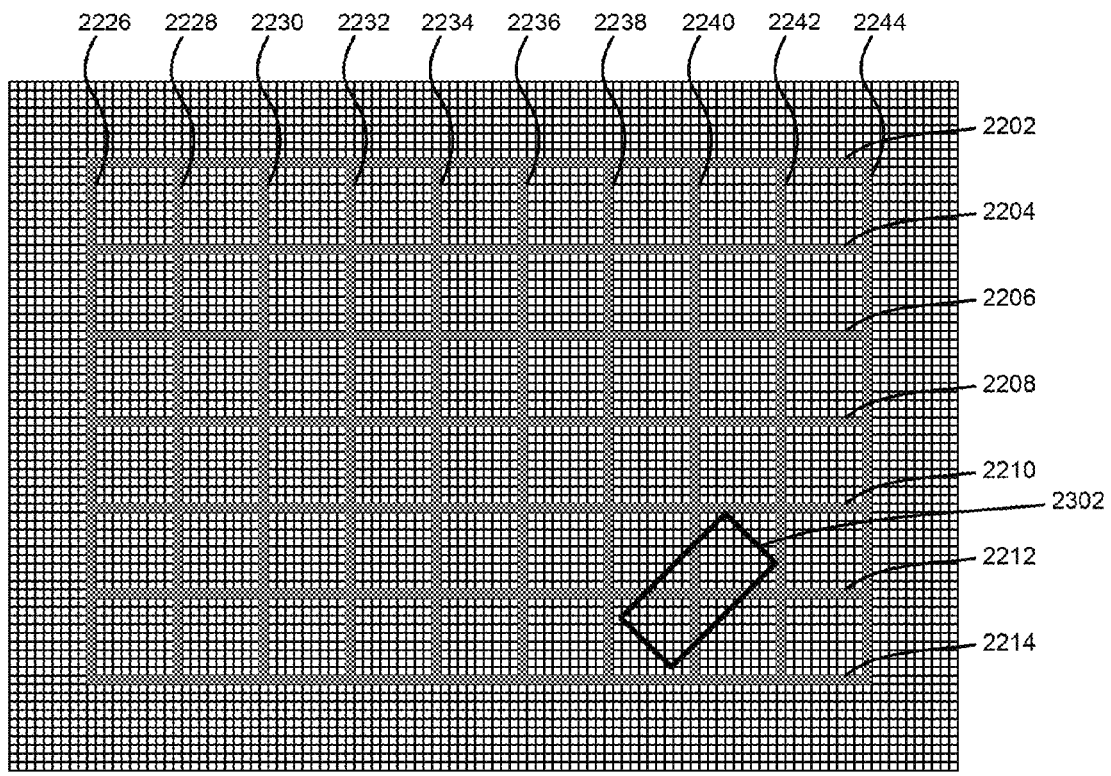
FIG. 13 is an image map indicating a set of pixel positions corresponding to image sensor pixels and exemplary sampling paths for sampling data that can be read from an image representation. For purposes of illustrating features of an indicia reading terminal, the resolution of the frame of image data illustrated in FIG. 7 is presented in lower resolution than that which will be observed in operation.

In the example of FIG. 13 where decodable indicia representation 2302 is located at the location shown, CPU 1060 after calculating autocorrelation scores for each sampling path 2202, 2204, 2206, 2208, 2210, 2212, 2214, 2226, 2228, 2230, 2232, 2234, 2236, 2238, 2240, 2242, and 2244 can determine that path 2212 has the highest autocorrelation score out of the horizontal sampling paths, that path 2240 has the highest autocorrelation score out of the vertical sampling paths, and can select paths 2212 and 2240 as the paths including image data representing a decodable indicia.

In one embodiment, CPU 1060 after calculating autocorrelation scores for various sampling paths can further process path data for further discrimination of a location of a decodable indicia representation along a path.

In one embodiment, selected paths selected as yielding the highest autodiscrimination scores and indicating an intersection of decodable indicia representation can be subjected to processing for classifying path image data as either background image data or decodable indicia image data. In one example, for performance of such classification, terminal 1000 can binarize image data along each selected sampling path. For binarization, path pixel value image data can be compared to a threshold and all pixel values below the threshold can be classified as decodable indicia, and all pixel values above the threshold can be classified as background. A mean value of a path can be selected as a threshold, or the threshold can be selected according to $T = \frac{1}{2}(I_{max} + I_{min})$. In another example, Otsu's algorithm can be utilized for determination of the threshold. Segments of a sampling path characterized by a high density of decodable indicia can be classified as decodable indicia segments. Image data at a location determined to include a decodable indicia representation can include image data defining dark portions of a decodable indicia and image data at pixel positions about such indicia.

Referring again to the flow diagram of FIG. 11, terminal 1000 at block 200 utilizes a result of the processing at block 100 to determine an imaging parameter.

In one example, terminal 1000 at block 200 can determine an imaging parameter in the form of an exposure period parameter. In an example of processing block 200, autocorrelation scores which may be calculated at block 100 may be utilized for determining an exposure period parameter. In other embodiments, other imaging parameters, e.g., gain input into amplifier 1036, or an illumination level parameter for input to light source bank 1204 can be controlled instead of or in addition to an exposure period.

Terminal 1000 at block 200 can calculate a white level for a frame selectively utilizing pixel values from sampling areas having autocorrelation scores determined to indicate that a decodable indicia is represented. For example, terminal 1000 can selectively utilize sampling paths yielding the highest autocorrelation score or scores, or autocorrelation scores above a threshold. At block 200, terminal 1000, for purposes of calculating a white level of a frame of image data, can discard sampled pixel values other than pixel values of decodable indicia segments of sampling paths having autocorrelation scores previously determined to indicate that a decodable indicia is represented.

At block 200, terminal 1000 can also discard pixel values of sampling paths outside of decodable indicia segments of such paths. For calculation of a white level for a frame, terminal 1000 can selectively utilize pixel data of selected sampling paths within decodable indicia segments of such paths. In one example, CPU 1060 can average pixel values of selected paths with decodable indicia segments of such paths for calculation of white levels. As has been indicated, terminal 1000 can process a frame of image data for determining a quality of a frame. In one example, a white level of a frame can be utilized in determining a quality of a frame. For example, a frame can be determined to be of suitable quality for a decode attempt if a white level of the frame falls within a predetermined range.

A new exposure period parameter determined at block 200 can be calculated using the following formulas:

$$\Delta E = K(W_T - W) \quad \text{Equation 3}$$

$$E_N = E_C + \Delta E \quad \text{Equation 4}$$

where W is the just-measured white level for a frame currently being processed calculated selectively utilizing pixel values within decodable indicia segments of sampling paths indicating that a decodable indicia is represented, $W_T$ is a target white level for a frame, K is a predetermined constant, $\Delta E$ is the change in exposure period, $E_N$ is a new exposure parameter to be applied for capture of a subsequent frame, and $E_C$ is the exposure period parameter for the current frame currently being subject to processing. It should be noted that the applied exposure parameters $E_C$ and $E_N$ may not be applied for capture of successive frames of image data. As has been indicated in connection with the timing diagram of FIG. 12, in many hardware platforms suitable for the operation as described herein, there will be a delay of one or more frame times after an exposure time parameter is applied for capture of a certain frame out of a succession of frames, before that certain frame is stored into memory 1080 where it is addressable for processing by CPU 1060. In typical operation, by application of the described exposure control method, applied exposure parameters for each successive frame can be varied until a frame is successfully decoded or until a trigger signal is manually deactivated. For example, it is seen from the exemplary timing diagram of FIG. 13 that $$\text{Exp}_2 \neq \text{Exp}_3 \neq \text{Exp}_{n-1} \neq \text{Exp}_n \neq \text{Exp}_{n+1}$$

Further referring to the flow diagram of FIG. 11, terminal 1000 at block 300 when utilizing an imaging parameter for capture of a subsequent frame of image data can apply an exposure parameter calculated as described above for capture of a subsequent frame of image data. For capture of a subsequent frame of image data utilizing the new exposure parameter, CPU 1060 can transmit the newly calculated exposure parameter, $E_N$, to timing and control circuit 1038 associated with image sensor 1032 via interface circuit 1028, which in one example can be provided by a PHILLIPS I²C two wire interface bus. Image sensor 1032 can then expose a frame of image data utilizing the exposure period parameter. Where the image sensor 1032 includes a global electronic shutter and the exposure period for each of several rows is initiated and terminated simultaneously, the exposure period parameter can be a frame exposure period. Where image sensor 1032 includes a rolling shutter the exposure parameter applied can be a row exposure period parameter, which can be repeated for each of several rows.

After exposure of image sensor array 1033, image information in the form of voltage signals corresponding to charges stored at the various pixels of image sensor 1032 can be read out of image sensor array 1033 on a row by row basis. The image information can be subject to conversion by A/D converter 1037 and routed to RAM 1080 for completion of capture of a frame of image data by storage into RAM 1080. When stored in RAM 1080 image data is addressable for processing by CPU 1060. Referring again to the flow diagram of FIG. 11, the capture of a subsequent frame utilizing an imaging parameter at block 300 can be regarded as completed by the storage of a subsequent frame of image data into RAM 1080.

Such processing can be carried out within a time period of less than a frame time, even using a CPU having a relatively modest clock speed (in one example, CPU 1060 can be incorporated in an MC9328MXLCVH15 microprocessor IC chip available from Freescale). In one embodiment, terminal 1000 can be adaptable so that processing periods 2126, 2128, 2130, 2132, and 2134 can be restricted from consuming a time period for processing of greater than a predetermined time, e.g., a frame time. In one specific embodiment, with reference to time plot 2122 of FIG. 12, the time periods for processing 2126, 2128, 2130, 2132, and 2134 can be substantially fixed. Where a time period for processing at periods 2126, 2128, 2130, 2132, and 2134 is restricted from consuming a time period greater than a frame time, CPU 1060 can determine a location of a decodable indicia representation in a frame prior to a time that a succeeding frame of image data is available for processing by CPU 1060. In one embodiment, where terminal 1000 has a frame time for a succession of frames of 16.6 ms, terminal 1000 can be operational so that processing periods 2126, 2128, 2130, 2132, 2134 are restricted from consuming a time period of more than 10 ms, and in another embodiment terminal 1000 can be operational so that processing periods 2126, 2128, 2130, 2132, 2134 are restricted from consuming a processing period of more than 5 ms.

Referring again to the flow diagram of FIG. 11, terminal 1000 after block 300 can subject the subsequent frame of image data to various processing, examples of which are described herein. In some embodiments, the processing which the subsequent frame is subject to can be related to the order of the frame. In some embodiments, terminal 1000 can be configured to avoid attempting to decode a first predetermined number of frames and in other embodiments, terminal 1000 can be configured to attempt to decode a frame conditionally on the condition that the frame passes a test for quality (e.g., a white level within a certain range). For some scenes in such embodiments, a number of frames may be subject to processing as described in connection with blocks 100 and 200 before a frame is captured that is subject to a decode attempt either by qualification by frame number or by quality measurement. In other embodiments, every frame of a succession of frames e.g., frame$_0$, frame$_1$ . . . , frame$_{n+1}$ . . . , can be subject to an attempt to decode. It is seen that where a subsequent frame is not subject to a decode attempt (e.g., only subject to context detection and to parameter and quality determination), a further subsequent frame (e.g., frame$_{R+S, s \geq 1}$ where frame$_R$ is the subsequent frame) may be subject to a decode attempt (e.g., where frame$_{R+S}$ passes a quality test). In such an example, subsequent frame$_R$, as well as the frame subject to processing for determining an imaging parameter yielding the subsequent frame, may be frames in a succession of frames that are of continually improving quality as a result of imaging parameters being calculated according to Equations 3 and 4 and applied to image sensor 1032.

CPU 1060, appropriately programmed can carry out a decoding process for attempting to decode a frame of image data. For attempting to decode, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

In one embodiment, terminal 1000 can incorporate a multitasking operating system, and CPU 1060 can be programmed to contemporaneously execute, as part of separate processing threads, the described (a) context detection and parameter (and possibly quality determination) processing and (b) decoding processing. However, whereas terminal 1000 can be adapted so that context detection and parameter and quality determination processing is restricted from consuming more than one frame time, decoding processing for attempting to extract a decoded message can, in one embodiment, consume more than one frame time. Accordingly, at a time CPU 1060 commences processing of a certain frame, frame=$frame_j$ for context detection and parameter and quality determination, CPU 1060 may be processing a previous frame, $frame_{j-k, k\geq 1}$ for decoding. Referring to the timing diagram of FIG. 12, CPU 1060 can, in accordance with a first thread, be subjecting $frame_n$ to context detection and parameter and quality determination processing, while CPU 1060 in accordance with a second thread at overlapping period 2144, can be processing $frame_{n-1}$ for attempting to decode.

In one embodiment, terminal 1000 can be adapted to avoid subjecting a frame of image data to a decode attempt unless the frame is determined to be of suitable quality for a decode attempt. Referring again to the timing diagram of FIG. 12, in which a specific example is illustrated, CPU 1060 may not commence decoding processing, in accordance with a decode processing thread at decode attempt processing period 2144 with respect to $frame_{n-1}$, until $frame_{n-1}$ is determined to be of suitable quality for a decode attempt as a result of processing occurring during processing period 2132.

In another embodiment, CPU 1060 can be adapted so that CPU 1060 ceases decoding a frame presently being subject to decoding, and commences decoding a more recently captured frame conditionally on a result of processing of the more recent frame at blocks 100 and 200. In another embodiment, CPU 1060 can be adapted to subject each newly stored frame to a decode attempt. Also, terminal 1000 can be programmed so that after imaging parameters are developed pursuant to context detection having certain characteristics, an acquired frame acquired using the imaging parameter is automatically subject to decoding without being subject to context detection. Accordingly, it is observed that processing after block 300 can include one or more of (a) subjecting the subsequent frame to context detection processing and/or parameter determination for utilization in capture of a subsequent frame and/or determining frame quality; and (b) subjecting the subsequent frame to a decode attempt.

While the present invention has been described with reference to a number of specific embodiments, numerous variations are possible. For example, at block 100, CPU 1060, rather than processing sampling path data for context detection of a frame can apply a texture filter set, e.g., a set such as:

$$\begin{bmatrix} 1 & 1 \\ -1 & -1 \end{bmatrix} \begin{bmatrix} -1 & 1 \\ -1 & 1 \end{bmatrix} \begin{bmatrix} 1 & 1 \\ -1 & 1 \end{bmatrix} \begin{bmatrix} 1 & 1 \\ 1 & -1 \end{bmatrix} \begin{bmatrix} 1 & -1 \\ 1 & 1 \end{bmatrix} \begin{bmatrix} -1 & 1 \\ 1 & 1 \end{bmatrix}$$

Figure 14:
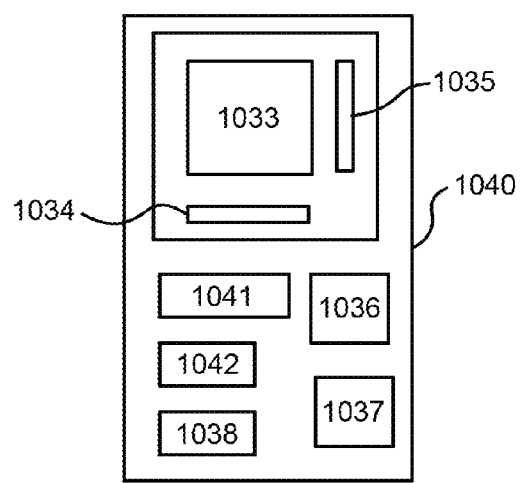
FIG. 14 is a block diagram including an alternative image sensor integrated circuit.

For performance of context detection, texture filter statistics can be examined for determining the existence of and a location of a decodable indicia representation. For example, where vertical and horizontal edges and density exceeds a predetermined threshold, CPU 1060 can determine that a linear bar code symbol is represented in image data. Furthermore, texture filters need not be applied by CPU 1060 with reference to stored frames of image data. For example, as shown in FIG. 14, image sensor integrated circuit 1040 can be modified to include N row buffer 1041 and N×N mask filter circuit 1042. Filters can be applied to image data as it is read out of integrated circuit 1040, the results can be accumulated, and data indicating the location of decodable indicia representation can be reported in a reference data location (e.g., a header or footer) of each frame. In such an embodiment, processing of image information for detecting a location of a decodable indicia can be carried out by circuitry of terminal 1000 other than CPU 1060 prior to storage of a frame of image data into RAM 1080. The processing required by CPU 1060 in such an embodiment for determining a location of decodable indicia in each frame can comprise reading of the data of the reference data location, which processing requires a processing time of only a fraction of a frame time.

Figure 15:
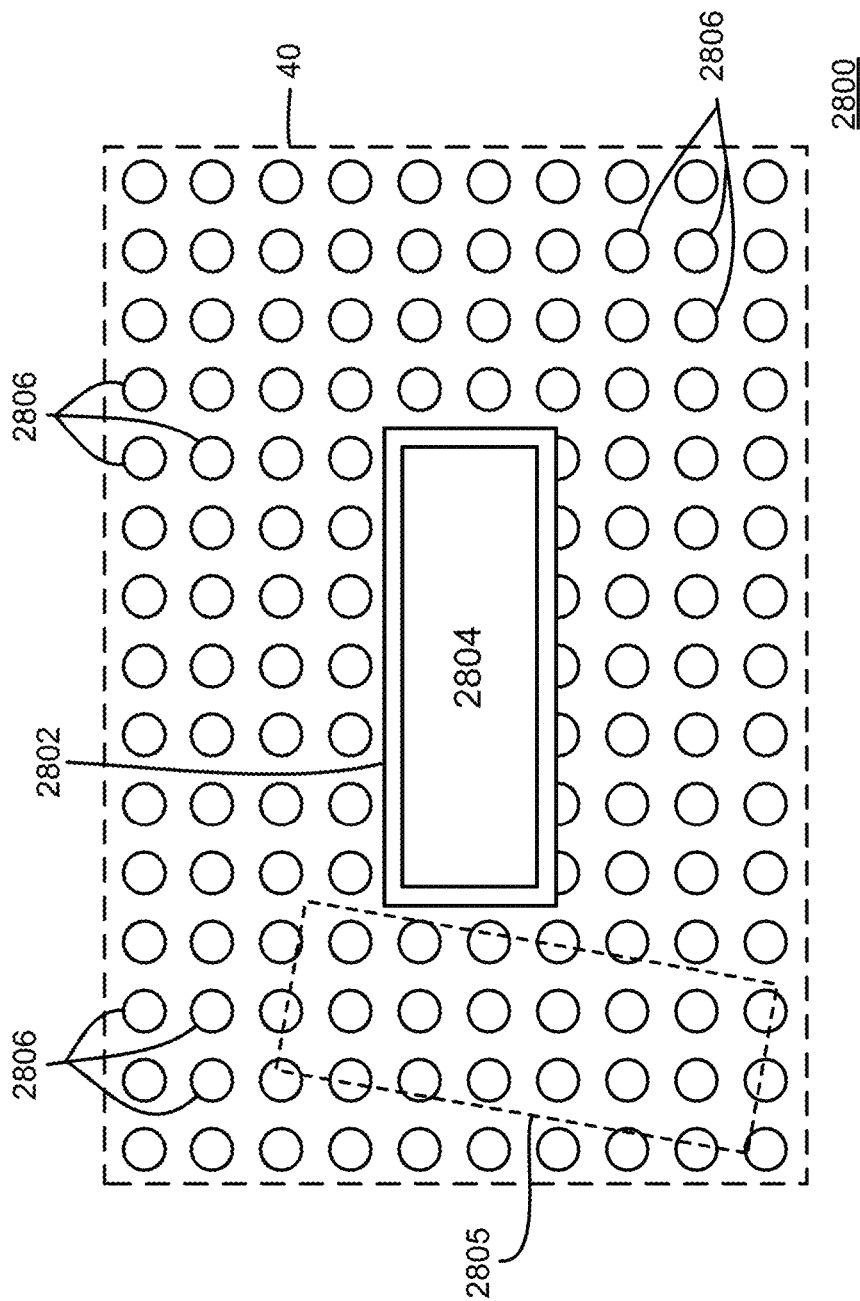
FIG. 15 is a diagram illustrating an exemplary scene condition under which a terminal operable according to a described method can successfully read a decodable indicia.

The method as described herein allows for reading of a decodable indicia in an expanded range of scene conditions. In the example of FIG. 15, a scene 2800 includes an array of energized red light emitting diodes (LEDs) 2806. Red LEDs 2806 can be arranged such that primary emission vectors of LEDs 2806 are directed generally toward a receive imaging path of an indicia reading terminal 1000 (not shown in FIG. 15) held in a position above scene 2800, such that the LED array comprising LEDs 2806 substantially spans an entirety of a field of view 40 of terminal 1000. In the example of FIG. 15, the energized red LED array comprises a 15×10 array of red light emitting LEDs, each energized to emit at about 800 MCD of luminous intensity. Further according to the described example of FIG. 15, a non-light transmissive substrate carrying decodable indicia 2804 can be disposed over a portion of the LED array as shown within a field of view 40 such that substrate 2802 encompasses less than 25% of the field of view 40. In such an example, terminal 1000, operating according to a described method can be operative to decode decodable indicia 2804, without the light emitted from LEDs 2806 causing a failure to read.

By operating according to a described method, terminal 1000 can utilize a determined location of a decodable indicia representation for capture of a frame that can be successfully decoded. In a specific example, by operating according to a described method, a portion of an image representation corresponding to decodable indicia 2804 (e.g., a bar code symbol, and OCR characters) can be detected as a decodable indicia representation, pixel values corresponding to indicia 2804 can be utilized for parameter determination for capture of a subsequent frame, and the subsequent frame (or further subsequent frame after one or more iterations of the method) can be subject to a successful decode attempt for decoding of decodable indicia 2302. By contrast, by a process according to a commercially available terminal, the terminal will attempt to set imaging parameters using image data corresponding to energized LEDs 2806, which imaging parameters will not produce image data corresponding to the area of indicia 2804 that is of sufficient quality for decoding. Further according to the described example, terminal 1000 operable according to described method can be operable to decode decodable indicia 2804 irrespective of a position of indicia 2804 within field of view 40. That is, terminal 1000 operational according to a described method can successfully decode decodable indicia 2804 when decodable indicia 2804 is disposed at an arbitrary position within field of view 40. For example, if substrate 2802 is moved to position 2805, terminal 1000 operable according to a described method can utilize pixel values corresponding to the area of position 2805 for determining an imaging parameter, and can subject a subsequent frame captured utilizing the imaging parameter (or a further subsequent frame captured after one or more iterations) to a successful decode attempt.

A small sample of systems methods and apparatus that are described herein is as follows:

A1. A hand held indicia reading terminal for reading of a decodable indicia, said hand held indicia reading terminal comprising:
an image sensor;
a lens assembly for use in focusing an image onto said image sensor;
a hand held housing encapsulating said image sensor, said hand held indicia reading terminal being operative to capture a succession of frames of image data;
a memory;
a CPU in communication with said memory operative for processing of frames of image data stored in said memory;
wherein said CPU is operative to subject a certain frame, frame=$frame_j$ of said succession of frames to frame quality evaluation processing where a result of said processing is responsive to one or more of an incidence of edges represented in said certain frame and a sharpness of edges represented in said certain frame of image data; and
wherein said CPU is operative so that said CPU can be subjecting a previous frame, frame=$frame_{j-k,\ k\geq1}$ to processing for attempting to decode contemporaneously while subjecting said certain frame to said frame quality evaluation processing.

A2. The hand held indicia reading terminal of claim A1, wherein said hand held indicia reading terminal in subjecting said certain frame to quality evaluation processing applies an edgelet filter.

A3. The hand held indicia reading terminal of claim A1, wherein said hand held indicia reading terminal in subjecting said certain frame to quality evaluation processing calculates an autocorrelation score for a sampling path.

A4. The hand held indicia reading terminal of claim A1, wherein said hand held indicia reading terminal is operative so that said hand held indicia reading terminal can cease decoding of said previous frame responsively to a result of said frame quality evaluation processing of said certain frame.

A5. The hand held indicia reading terminal of claim A1, wherein said CPU runs a multitasking operating system, and wherein said CPU according to a first program thread performs said frame quality evaluation processing and according to a second program thread performs said processing for attempting to decode.

A6. The hand held indicia reading terminal of claim A1, wherein said hand held indicia reading terminal is operative so that said hand held indicia reading terminal can commence attempting to decode said previous frame at a first time and can determine that said previous frame cannot be decoded at a second time, wherein said hand held indicia reading terminal is further operative so that said hand held indicia reading terminal can select for decoding processing responsively to said determining that said previous frame cannot be decoded a next frame for decoding, said next frame for decoding being a frame that has been stored in said memory at a time between said first time and said second time.

A7. The hand held indicia reading terminal of claim A1, wherein said hand held indicia reading terminal is operative so that said hand held indicia reading terminal captures said succession of frames responsively to an operator activated trigger signal being activated by an operator.

B1. A hand held indicia reading terminal for use in reading of a decodable indicia, said hand held indicia reading terminal comprising:
an image sensor;
a lens assembly for use in focusing an image onto said image sensor;
a hand held housing encapsulating said image sensor, said hand held indicia reading terminal being operative to capture a succession of frames of image data including a certain frame, frame=$frame_j$;
a memory;
a CPU in communication with said memory operative for processing of frames of image data stored in said memory;
wherein said CPU is operative to subject each of a plurality of frames of said succession of frames including a certain frame, frame=$frame_j$ to frame quality evaluation processing where a result of said frame quality evaluation processing for each frame of said plurality of frames is responsive to one or more of an incidence of and a sharpness of edges represented therein; and
wherein said CPU is operative so that said CPU can be subjecting a previous frame, frame=$frame_{j-k,\ k\geq1}$ to a decode attempt concurrently while subjecting said certain frame, frame=$frame_j$ to said frame quality evaluation processing, wherein said terminal is further operative so that, responsively to a result of said processing of said certain frame, frame=$frame_j$, of image data, said CPU can cease attempting to decode utilizing said previous frame, frame=$frame_{j-k,\ k\geq1}$ of said succession of frames.

B2. A hand held indicia reading terminal of claim B1, wherein said hand held indicia reading terminal is operative so that said hand held indicia reading terminal is capable of accumulating a code word decoded from said previous frame, frame=$frame_{j-k,\ k\geq1}$ and combining said accumulated code word with a code word decoded from said certain frame, frame=$frame_j$.

B3. The hand held indicia reading terminal of claim B1, wherein said hand held indicia reading terminal in subjecting said certain frame, frame=$frame_j$ to frame quality evaluation processing applies an edgelet filter.

B4. The hand held indicia reading terminal of claim B1, wherein said hand held indicia reading terminal in subjecting said certain frame, frame=$frame_j$ to quality evaluation processing calculates an autocorrelation score for a sampling path.

B5. The hand held indicia reading terminal of claim B1, wherein said hand held indicia reading terminal is operative so that said hand held indicia reading terminal can cease decoding utilizing said previous frame, frame=$frame_{j-k,\ k\geq1}$ responsively to a determination that said certain frame, frame=$frame_j$ has a higher quality score that said previous frame, frame=$frame_{j-k,\ k\geq1}$.

B6. The hand held indicia reading terminal of claim B1, wherein said hand held indicia reading terminal is operative so that said hand held indicia reading terminal is restricted from ceasing decoding utilizing said previous frame, frame=frame$_{j-k,\ k\geq1}$ responsively to a decode status of said previous frame, frame=frame$_{j-k,\ k\geq1}$ in such a manner that said ceasing of said decoding processing utilizing said previous frame, frame=frame$_{j-k,\ k\geq1}$ can be restricted if said decode status of said previous frame, frame=frame$_{j-k,\ k\geq1}$ satisfies a predetermined criteria.

B7. The hand held indicia reading terminal of claim B6, wherein said decode status is based on one or more of a percentage of total code words decoded, a decoding stage, and an elapsed time for decoding.

C1. A hand held indicia reading terminal for use in reading of a decodable indicia, said hand held indicia reading terminal comprising:
an image sensor;
a lens assembly for use in focusing an image onto said image sensor;
a memory;
a CPU in communication with said memory operative for processing of frames of image data stored in said memory;
a hand held housing encapsulating said image sensor;
wherein said hand held indicia reading terminal is operative to capture into said memory a succession of frames of image data, said hand held indicia reading terminal being operative so that said succession of frames are captured according to a frame rate such that each frame is captured within a frame time;
wherein said CPU is operative to perform calculations utilizing image data of each of a plurality of frames of said succession of frames for performance of frame quality evaluation processing for each of said plurality of frames of said succession of frames; and
wherein a result of said frame quality evaluation processing for each frame of said plurality of frames is responsive to one or more of an incidence of edges and a sharpness of edges represented therein, and wherein said frame quality evaluation processing by said CPU for subjecting each of said plurality of frames of said succession of frames to said frame quality evaluation processing is restricted from consuming a time period of longer than said frame time.

C2. The hand held indicia reading terminal of claim C1 wherein said frame quality evaluation processing by said CPU for evaluating each of said plurality of frames of said succession of frames is restricted from consuming a time period of longer than one half of said frame time.

C3. The hand held indicia reading terminal of claim C1 wherein said hand held indicia reading terminal is operative so that said hand held indicia reading terminal can select a next frame for decoding responsively to a result of said frame quality evaluation processing.

C4. The hand held indicia reading terminal of claim C1 wherein as part of said frame quality evaluation processing said CPU determines a region of interest for a certain of said succession of frames, and wherein said terminal is operative so that said terminal attempting to decode said certain frame can utilize said region of interest.

D1. A hand held indicia reading terminal, said hand held indicia reading terminal comprising:
an image sensor;
a lens assembly for focusing an image onto said image sensor;
a hand held housing encapsulating said image sensor;
a memory;
a CPU in communication with said memory operative for processing of frames of image data stored into said memory;
wherein said hand held indicia reading terminal is operative to capture into said memory a succession of frames of image data, wherein said hand held indicia reading terminal is further operative so that said succession of frames of image data are captured according to a frame rate such that each frame of said succession of frames of image data is captured within a frame time;
wherein said CPU is operative to subject each frame of said succession of frames to frame quality evaluation processing where a result of said frame quality evaluation processing for said each frame is responsive to one or more of an incidence of edges represented in said each frame and a sharpness of edges represented in said each frame, and wherein said frame quality evaluation processing by said CPU for evaluating said each frame of said succession of frames is restricted from consuming a time period of longer than said frame time;
wherein said hand held indicia reading terminal is further operative so that said succession of frames can be captured responsively to an activation of an operator activated signal, said hand held indicia reading terminal being operative so that said operator activated signal can be activated in response to an actuation of a user interface component of said terminal; and
wherein said hand held indicia reading terminal is operative so that in response to said operator activated signal being activated, said hand held indicia reading terminal utilizes results of said frame quality evaluation processing for said succession of frames for determination of a selectively output frame for selective output by one or more of storing said selectively output frame to a non-volatile memory or displaying on said selectively output frame a display.

D2. The hand held indicia reading terminal of claim D1, wherein said hand held indicia reading terminal is operative to decode decodable indicia.

D3. The hand held indicia reading terminal of claim D1, wherein said hand held indicia reading terminal is operative to decode decodable indicia, wherein said operator activated signal is a picture taking signal and wherein said hand held indicia reading terminal is operative so that decode attempt processing is not initiated responsively to said picture taking signal being activated.

D4. The hand held indicia reading terminal of claim D1, wherein said operator activated signal is a trigger signal and wherein said hand held indicia reading terminal is adapted so that said hand held indicia reading terminal initiates decode attempt processing responsively to said trigger signal being activated.

D5. The hand held indicia reading terminal of claim D1, wherein said operator activated signal is a trigger signal and wherein said terminal is operative so that responsively to said trigger signal being made active said succession of frames are captured into said memory, wherein said terminal is operative so that said terminal can subject to a decode attempt a first of said succession of frames, and can select as said selective output frame without subjecting to a decode attempt a second of said succession of frames, wherein the first and second frames are different frames.

D6. The hand held indicia reading terminal of claim D1, wherein said output frame that can be output responsively to a result of said processing of said succession of frames is a frame of said succession of frames determined to have a highest quality score.

D7. The hand held indicia reading terminal of claim D1, wherein said terminal is operative to attempt to decode decodable indicia in response to activation of a trigger signal, and is further operative to selectively output a frame of image data without initiation of a decode attempt in response to activation to a picture taking signal, wherein said operator activated signal is provided either by said trigger signal or said picture taking signal, and wherein an algorithm by which said frame quality evaluation processing is carried out is differentiated depending on whether said operator activated signal is provided by said trigger signal or by said picture taking signal.

E1. A hand held indicia reading terminal comprising:
an image sensor;
a lens assembly for use in focusing images corresponding to a target substrate onto said image sensor, said hand held indicia reading terminal being operative for capture of a succession of frames of image data, where said succession of frames, when said hand held indicia reading terminal is directed at a vibrating substrate having certain vibration characteristics that bears a decodable indicia, can include motion frames having exposure periods corresponding to motion phases of said vibrating substrate and stop frames having exposure periods proximate a stop phase of said vibrating substrate;
wherein said hand held indicia reading terminal is configured so that in response to activation of a trigger signal with said hand held indicia reading terminal being directed toward a vibrating substrate having said certain vibration characteristics that bears a decodable indicia, said hand held indicia reading terminal is operative for discriminating between said motion frames and said stop frames;
wherein said indicia reading terminal is further configured so that in response to said trigger signal being activated with said hand held indicia reading terminal being directed toward a decodable indicia bearing vibrating substrate having said certain vibration characteristics, said hand held indicia reading terminal is operative to utilize a result of said discriminating selecting a frame for subjecting to a decode attempt;
wherein said hand held indicia reading terminal is further configured so that in response to activation of a trigger signal with said hand held indicia reading terminal being directed toward a vibrating substrate having said certain vibration characteristics that bears a decodable indicia, said hand held indicia reading terminal captures a succession of frames and selects for a decode attempt a stop frame.

E2. The hand held indicia reading terminal of claim E1, wherein said hand held indicia reading terminal is configured so that in response to said trigger signal being activated a plurality of times in succession with said hand held indicia reading terminal being directed at a vibrating decodable indicia bearing substrate having said certain vibration characteristics, said hand held indicia reading terminal, for each of said activation, captures a succession of frames and selects for a decode attempt a stop frame.

E3. The hand held indicia reading terminal of claim E1, wherein said hand held indicia reading terminal is configured so that in response to said trigger signal being activated ten times in succession said hand held indicia reading terminal successfully decodes a QR Code symbol ten times within 15 seconds where said a vibrating substrate bears said QR Code symbol, receives illumination at about 120 lux, is located within about 3 in of a best focus distance of said hand held indicia reading terminal, and is vibrated at about 890 rpm horizontally with about a ⅝ inch amplitude.

F1. A method for operating an indicia reading terminal for decoding of a decodable indicia, said indicia reading terminal including an image sensor and an imaging lens assembly for focusing of an image of said decodable indicia onto said image sensor, said indicia reading terminal being operative to capture at a frame rate a succession of frames of image data, said method comprising the steps of:
(a) processing image information to determine a location of a decodable image representation in a certain frame of image data;
(b) determining an imaging parameter utilizing a result of said processing step (a); and
(c) utilizing said imaging parameter determined at step (b), capturing a subsequent frame of image data.

F2. The method of claim F1, wherein said processing step (a) includes the step of storing a frame of image data into a CPU addressable memory.

F3. The method of claim F1, wherein said processing step (a) includes the step of sampling image data along a plurality of sampling paths.

F4. The method of claim F1, wherein said processing step (a) includes the step of sampling image data along one or more of a plurality of horizontal sampling paths and a plurality of vertical sampling paths.

F5. The method of claim F1, wherein said processing step (a) includes the step of calculating an autocorrelation score for a sampling path.

F6. The method of claim F1, wherein said processing step (a) includes selecting among the highest autocorrelation scores for a plurality of sampling paths.

F7. The method of claim F1, wherein said processing step (a) is initiated responsively to an operator actuating a trigger of said indicia reading terminal.

F8. The method of claim F1, wherein said processing step (a) includes the step of determining a plurality of locations including decodable indicia representations.

F9. The method of claim F1, wherein said determining step (b) includes determining an exposure period parameter.

F10. The method of claim F1, wherein said determining step (b) includes selectively utilizing image data at a location of said certain frame determined to include a decodable indicia representation.

F11. The method of claim F1, wherein responsively to a trigger signal being made active by actuation of a trigger, said indicia reader captures a plurality of frames of image data including said certain frame and said subsequent frame, and wherein said certain frame and said subsequent frame are not successive frames.

F12. The method of claim F1, wherein said processing step (a) includes processing completed prior to storage of said certain frame of image data into a CPU addressable memory.

F13. The method of claim F1, wherein said method further includes the step of subjecting said subsequent frame to context detection.

F14. The method of claim F1, wherein said method further includes the step of subjecting said subsequent frame to processing for parameter determination.

F15. The method of claim F1, wherein said method further includes the step of subjecting at least one of said subsequent frame or a further subsequent frame to a decode attempt for decoding of decodable indicia.

F16. The method of claim F1, wherein said method further includes the steps of repeating steps (a), (b), and (c) for a plurality of frames of image data so that a plurality of subsequent frames are captured, and subjecting at least one said subsequent frame of image data to a decode attempt.

G1. A hand held indicia reading terminal for reading of a decodable indicia, said hand held indicia reading terminal comprising:
an image sensor;
an optics assembly focusing an image of said decodable indicia onto said image sensor;
a hand held housing encapsulating said image sensor, said hand held indicia reading terminal being adapted to capture a succession of frames of image data according to a frame rate such that each frame of said succession of captured frames is captured within a frame time;
a trigger disposed on said hand held housing for initiation of an indicia decode attempt;
wherein said hand held indicia reading terminal is operative for (a) processing a certain frame of a succession of frames for a period of less than said frame time for determining a location of a decodable indicia representation in said certain frame;
wherein said hand held indicia reading terminal is further operative for (b) utilizing a result of said processing (a) for determining an imaging parameter; and
wherein said hand held indicia reading terminal is further operative for (c) utilizing said imaging parameter for capturing of a subsequent frame of image data.

G2. The hand held indicia reading terminal of claim G1, wherein said processing (a) includes reading location data from a frame reference data location.

G3. The hand held indicia reading terminal of claim G1, wherein said processing (a) includes applying texture filters to said certain frame.

G4. The hand held indicia reading terminal of claim G1, wherein said processing (a) includes processing data along sampling paths of said certain frame.

H1. A hand held indicia reading terminal for reading of a decodable indicia, said hand held indicia reading terminal comprising:
a two dimensional image sensor having a plurality of pixels arranged in columns and rows of pixels;
an optics assembly focusing an image of said decodable indicia onto said two dimensional image sensor;
a memory;
a central processing unit (CPU);
a trigger disposed on said hand held housing for initiation of an indicia decode attempt;
wherein said hand held indicia reading terminal is operative so that subsequent to said trigger being actuated, said hand held indicia reading terminal stores into said memory a succession of frames of image data for processing by said CPU, wherein said hand held indicia reading terminal is further operative so that said succession of frames are captured according to frame rate such that each of said frames of image data is captured within a frame time;
wherein said hand held indicia reading terminal is further operative so that subsequent to said trigger being actuated, said CPU subjects each of a plurality of said succession of frames to processing that includes determining a location of a decodable indicia representation in a frame of image data, and utilizing a result of said location determining for determining an imaging parameter for use in capture of a subsequent frame.

H2. The hand held indicia reading terminal of claim H1, wherein said hand held indicia reading terminal is operative so that said processing by said CPU for each of said plurality of frames including processing for determining a location of a decodable indicia representation and utilizing a result of said location determining for determining an imaging parameter is restricted from consuming a time period for processing of greater than said frame time.

I1. A hand held indicia reading terminal for reading of a decodable indicia, said hand held indicia reading terminal comprising:
an image sensor;
an optics assembly focusing an image of said decodable indicia onto said image sensor;
a hand held housing encapsulating said image sensor, said hand held indicia reading terminal being adapted to capture a succession of frames of image data;
wherein said indicia reading terminal is operative to utilize a determined location of a decodable indicia representation corresponding to said decodable indicia for frame capture so that said indicia reading terminal is capable of successfully decoding a decodable indicia disposed in a scene within a field of view of said indicia reading terminal, wherein said scene includes an energized red LED array substantially spanning said field of view, and a non-light transmissive substrate carrying said decodable indicia disposed over said red LED array at an arbitrary position over said red LED array within said field of view such that said non-light transmissive substrate encompasses less than 25% of said field of view, and a remaining portion of said field of view corresponds to said red LED array.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An indicia reader comprising:
an image sensor for generating frames of image data;
a processor in communication with the image sensor, the processor being configured for:
capturing a succession of frames of image data with the image sensor;
processing a certain frame, frame=$frame_j$ of the succession of frames to evaluate its frame quality based on an incidence of edges and/or a sharpness of edges represented in the certain frame and determine if the certain frame satisfies a predetermined criteria;
while processing the certain frame, attempting to decode a previous frame, frame=$frame_{j-k}$, where k≥1; and
if the certain frame satisfies the predetermined criteria, ceasing the attempt to decode the previous frame.

2. The indicia reader of claim 1, wherein the processor is configured for, when processing the certain frame to evaluate its frame quality, applying an edgelet filter.

3. The indicia reader of claim 1, wherein the processor is configured for, when processing the certain frame to evaluate its frame quality, calculating an autocorrelation score for a sampling path.

4. The indicia reader of claim 1, wherein the processor is configured for:
running a multitasking operating system;
processing the certain frame to evaluate its frame quality according to a first program thread; and
attempting to decode the previous frame according to a second program thread.

5. The indicia reader of claim 1, comprising memory, wherein the processor is configured for:
   storing the captured succession of frames in memory;
   at a first time, commencing attempting to decode the previous frame;
   at a second time, determining whether the previous frame can be decoded;
   if the previous frame cannot be decoded, selecting a next frame that was stored in memory at a time between the first time and the second time; and
   attempting to decode the next frame.

6. An indicia reader comprising:
   an image sensor for generating frames of image data;
   a lens assembly for use in focusing light onto the image sensor;
   a memory for storing frames of image data generated by the image sensor;
   a processor in communication with the image sensor and the memory, the processor being configured for:
      capturing a succession of frames of image data with the image sensor, the frames being stored in the memory;
      processing a certain frame, frame=$frame_j$ of the succession of frames to evaluate its frame quality based on an incidence of edges and/or a sharpness of edges represented in the certain frame and determine if the certain frame satisfies a first predetermined criteria;
      while processing the certain frame, attempting to decode a previous frame, frame=$frame_{j-k}$, where k≥1; and
      if the certain frame satisfies the first predetermined criteria, ceasing the attempt to decode the previous frame.

7. The indicia reader of claim 6, wherein the processor is configured for:
   in response to a successful attempt to decode the previous frame, storing a first code word from the decoded previous frame;
   decoding the certain frame to obtain a second code word; and
   combining the first code word and the second code word.

8. The indicia reader of claim 6, wherein the processor is configured for, when processing the certain frame to evaluate its frame quality, applying an edgelet filter.

9. The indicia reader of claim 6, wherein the processor is configured for, when processing the certain frame to evaluate its frame quality, calculating an autocorrelation score for a sampling path.

10. The indicia reader of claim 6, wherein the processor is configured for:
    processing the certain frame to determine its quality score;
    processing the previous frame to determine its quality score;
    determining if the certain frame's quality score is higher than the previous frame's quality score; and
    if the certain frame's quality score is higher than the previous frame's quality score, ceasing the attempt to decode the previous frame.

11. The indicia reader of claim 6, wherein the processor is configured for:
    determining a decode status of the attempt to decode the previous frame;
    determining if the previous frame's decode status satisfies a second predetermined criteria; and
    if the previous frame's decode status satisfies the second predetermined criteria and the certain frame satisfies the first predetermined criteria, continuing the attempt to decode the previous frame.

12. The indicia reader of claim 11, wherein the decode status is based on a percentage of total code words decoded, a decoding stage, and/or an elapsed time for decoding.

13. An indicia reader comprising:
    an image sensor for generating frames of image data;
    a processor in communication with the image sensor, the processor being configured for:
       capturing a succession of frames of image data with the image sensor at a frame rate, wherein each frame is captured within a frame time;
       processing each of a plurality of frames from the succession of frames to evaluate its frame quality based on an incidence of edges and/or a sharpness of edges represented in the frame and determine if it satisfies a first predetermined criteria;
       for each of the plurality of frames, determining if a processing time for the processing to evaluate its frame quality exceeds the frame time;
       for each of the plurality of frames, if the processing time exceeds the frame time, ceasing the processing to evaluate its frame quality; and
       for each of the plurality of frames, if a certain frame satisfies the first predetermined criteria, ceasing an attempt to decode a previous frame relative to the certain frame of the succession of frames.

14. The indicia reader of claim 13, wherein the processor is configured for:
    for each of the plurality of frames, determining if a processing time for the processing to evaluate its frame quality exceeds half of the frame time; and
    for each of the plurality of frames, if the processing time exceeds half of the frame time, ceasing the processing to evaluate its frame quality.

15. The indicia reader of claim 13, wherein the processor is configured for:
    selecting a next frame based on the processing of the plurality of frames; and
    attempting to decode the next frame.

16. The indicia reader of claim 13, wherein the processor is configured for:
    while processing a certain frame to evaluate its frame quality, determining a region of interest; and
    attempting to decode the certain frame using the determined region of interest.

17. The indicia reader of claim 13, wherein the processor is configured for attempting to decode a given frame from the succession of frames.

18. The indicia reader of claim 13, comprising:
    a display in communication with the processor; and
    a user interface component for generating an activated signal in response to actuation of the user interface component, wherein the processor is configured for:
    receiving the activated signal;
    in response to the activated signal, capturing the succession of frames of image data;
    selecting an output frame from the plurality of frames based on its image quality; and
    displaying the selected output frame on the display.

19. The indicia reader of claim 18, wherein the processor is configured for:
    attempting to decode a frame generated by the image sensor; and
    in response to the activated signal, not attempting to decode the captured succession of frames.

20. The indicia reader of claim 18, wherein the processor is configured for:
    selecting a certain frame from the captured succession of frames that is not the output frame; and
    attempting to decode the certain frame.

* * * * *